United States Patent
Riedel et al.

(10) Patent No.: US 7,693,093 B2
(45) Date of Patent: Apr. 6, 2010

(54) QOS-AWARE HANDOVER PROCEDURE FOR IP-BASED MOBILE AD-HOC NETWORK ENVIRONMENTS

(75) Inventors: Matthias Riedel, Stuttgart (DE); Yigang Xu, Shanghai (CN)

(73) Assignee: Sony Deutschland GmbH, Cologne (DE)

( * ) Notice: Subject to any disclaimer, the term of this patent is extended or adjusted under 35 U.S.C. 154(b) by 1577 days.

(21) Appl. No.: 10/795,818

(22) Filed: Mar. 8, 2004

(65) Prior Publication Data

US 2004/0228304 A1 Nov. 18, 2004

(30) Foreign Application Priority Data

Mar. 10, 2003 (EP) .................... 03005263
Aug. 11, 2003 (EP) .................... 03018241

(51) Int. Cl.
*H04L 12/66* (2006.01)
(52) U.S. Cl. ........................... 370/260; 370/352
(58) Field of Classification Search ......... 370/352–356, 370/252, 328, 389, 260
See application file for complete search history.

(56) References Cited

U.S. PATENT DOCUMENTS

| | | | |
|---|---|---|---|
| 4,999,833 A | 3/1991 | Lee | |
| 5,452,294 A | 9/1995 | Natarajan | |
| 6,044,075 A | 3/2000 | Le Boudec et al. | |
| 6,385,454 B1 | 5/2002 | Bahl et al. | |

2002/0114332 A1 8/2002 Apostolopoulos et al.

FOREIGN PATENT DOCUMENTS

| | | |
|---|---|---|
| EP | 0 753 952 | 1/1997 |
| EP | 0 859 476 | 8/1998 |
| EP | 0 897 253 | 2/1999 |
| EP | 1 091 530 | 4/2001 |
| EP | 1 324 628 A1 | 7/2003 |
| WO | WO 00/38468 | 6/2000 |

OTHER PUBLICATIONS

S. Shenker, et al. "Network Element Service Specification Template," Sep. 1997, 22 Pages.
R. Braden, Ed, et al. "Resource Reservation Protocol (RSVP)—Version 1 Functional Specification," Sep. 1997, 112 Pages.

(Continued)

*Primary Examiner*—Suhan Ni
(74) *Attorney, Agent, or Firm*—Oblon, Spivak, McClelland, Maier & Neustadt, L.L.P.

(57) ABSTRACT

A handover method for a wireless mobile network including interconnected mobile nodes having time varying connectivity includes determining Quality of Service (QoS) resources of each potential routing path between a mobile node and a correspondent node. The method also includes pre-allocating the QoS resources along at least one potential routing path in advance before initiating a handover of a data flow to be transmitted from the mobile node to the correspondent node via a selected routing path. In addition, the method includes redirecting the data flow to a routing path with best available QoS capabilities as the selected routing path and, in case of sufficient QoS capabilities, reserving the determined QoS resources for the data flow to be transmitted via the selected routing path.

18 Claims, 30 Drawing Sheets

OTHER PUBLICATIONS

S. Blake, et al. "An Architecture for Differentiated Services" Dec. 1998, 36 Pages.

Seoung-Bum Lee, et al. "Insignia: An IP-Based Quality of Service Framework for Mobile AD HOC Networks" Dec. 15, 1999, Journel of Parallel and Distributed Computing, 60, pp. 374-406 (2000).

Lixia Zhang, et al. "RSVP: A New Resource Reservation Protocol" Published in IEEE Network Magazine Sep. 1993—vol. 7, No. 5, pp. 116-127.

Anup K. Talukdar, et al. "MRSVP: A Resource Reservation Protocol for an Integrated Services Network With Mobile Hosts" 29 Pages, A preliminary version of this paper appeared as Rutgers DCS Techinical Report DCS-TR-337.

K. Nichols, et al. "Definition of the Differentiated Services Field (DS Field) in the IPV4 and IPV6 Headers," Dec. 1998, 20 Pages.

S. Deering, et al. "Internet Protocol, Version 6 (IPV6) Specification," Dec. 1998, 39 Pages.

G. Huston "Next Steps for the IP QOS Architecture," Nov. 2000, 24 Pages.

J. Manner, et al. "Mobility Related Terminology," May 31, 2002, 26 Pages.

O. H. Levkowetz, et al. "Problem Description: Reasons for Performing Context Transfers Between Nodes in an IP Access Network," Jun. 2001, 11 Pages.

Hemant Chaskar, et al. "A Framework for QOS Support in Mobile IPV6," Mar. 2001, 11 Pages.

S. Corson, et al. "Mobile Ad Hoc Networking (MANET): Routing Protocol Performance Issues and Evaluation Considerations," Jan. 1999, 12 Pages.

David C. Plummer, et al. "An Ethernet Address Resolution Protocol—or—Converting Network Protocol Addresses to 48.Bit Ethernet Address for Transmission on Ethernet Hardware," Nov. 1982, 10 Pages.

Ross Finlayson, et al. "A Reverse Address Resolution Protocol," Jun. 1984, 4 Pages.

T. Narten, et al. "Neighbor Discovery for IP Version 6 (IPV6)," Dec. 1998, 93 Pages.

A. Conta "Extensions to IPV6 Neighbor Discovery for Inverse Discovery Specification," Jun. 2001, 20 Pages.

Goutham Karumanchi, et al. "Information Dissemination in Partitionable Mobile Ad Hoc Networks," 10 Pages.

Andrea De Carolis, et al. "QOS-Aware Handover for Mobile IP: Secondary Home Agent," Apr. 2000, 25 Pages.

Hong Wen Lin "QOS Aware Handover Scheme for the New Generation Wireless Networks," Jul. 2002, 62 pages, English Thesis with partial Chinese Summarization.

Klara Nahrstedt, et al. "Cross-Layer Design for Data Accessibility in Mobile Ad Hoc Networks," Dec. 2007, 24 Pages.

Dinesh Dharmaraju, et al. "INORA—A Unified Signaling and Routing Mechanisms for QOS Support in Mobile Ad Hoc Networks," Proceedings of the International Conference on Parallel Processing Workshops (ICPPW'02) 2002 IEEE, 8 Pages.

| Flow Label | Source Address | Neighbor Address | Max. BW | Min. BW | HR | SR | Timer | Indicator |
|---|---|---|---|---|---|---|---|---|
|  |  |  |  |  |  |  |  |  |
|  |  |  |  |  |  |  |  |  |
|  |  |  |  |  |  |  |  |  |

Flow ID — Path History — Required QoS — Monitored QoS

| | | Option Type | Option Len |
|---|---|---|---|
| Flags | Lifetime | | |
| MAC address (48 bits) | | | |
| IPv6 Address (128 bits) | | | |

Fig. 37

QOS-AWARE HANDOVER PROCEDURE FOR IP-BASED MOBILE AD-HOC NETWORK ENVIRONMENTS

BACKGROUND OF THE INVENTION

1. Field of the Invention

The present invention generally relates to the field of wireless computing in mobile ad-hoc networking environments. More specifically, it is directed to the field of Quality-of-Service (QoS) management for adaptive real-time services running on mobile devices, which support different access technologies in dynamic Internet Protocol (IP)based mobile ad-hoc networks where the connectivity of interconnected fixed and/or mobile nodes is unpredictably time-varying. In this connection, the invention presents different methods for a QoS-aware handover procedure based on resource probing, pre-allocating, reserving, and adaptation mechanisms in a typical dynamic mobile ad-hoc scenario. Moreover, the invention proposes an "information dissemination" approach which optimizes prior-art address resolution mechanisms, in particular in a dynamic mobile ad-hoc environment.

2. Discussion of the Background

Mobile ad-hoc networks, which have been the focus of many recent research and development efforts, can be described as temporary multi-hop wireless networks which consist of a number of interconnected mobile nodes such as PDAs, mobile phones or notebooks using a wireless interface to transmit packet data. Such a mobile ad-hoc network is self-organized and does not need any existing network infrastructure or centralized administration. The vision of mobile ad-hoc networking as described in the article Ad hoc Networking (MANET): Routing Protocol Performance Issues and Evaluation Considerations" (RFC 2501, January 1999) by S. Corson and J. Macker is to support robust and efficient operation in mobile wireless networks by incorporating router and host functionality into mobile nodes such that these nodes are able to forward packets on behalf of other mobile nodes and run user applications. Since mobile ad-hoc networks are envisioned to have random, dynamic, sometimes rapidly changing multi-hop topologies, which are composed of relatively bandwidth-constrained wireless links, the introduction of time-sensitive services into the realm of autonomous, mobile, wireless domains will have to face great challenges when considering real-time QoS support.

Typically, mobile ad-hoc networks (MANETs) operate with distributed functions and allow traffic to pass over multiple radio hops between a source and a destination. Routing algorithms and the implications of radio layers are typical features of these networks. The inherent unpredictability in a network whose nodes move poses a challenge to routing and mobility functions if data is consistently transferred between the nodes of the underlying network. Nonetheless, multi-hop radio systems also make it possible to save battery capacity while retaining performance. In any case, the most attractive property of an ad-hoc networking model is perhaps its independence from centralized control and, thus, the increased freedom and flexibility it gives the user.

In order to understand the central idea of the invention, it is necessary to briefly explain some of the most important features involved with currently available QoS-aware handover management technologies according to the state of the art.

As described in the "Element Service Specification Template" (IETF RFC 2216, September 1997) by S. Shenker and S. Wroclawski, different QoS reservation concepts are offered to mobile users today. The term "quality of service" (QoS) thereby refers to the nature of the provided packet delivery service, as described by different parameters such as the currently available bandwidth, packet delay, and packet loss rates. Traditionally, the Internet offers a single-QoS, best-effort delivery, in which the available bandwidth and delay characteristics depend on the instantaneous load. The control over QoS seen by applications is exercised by an adequate provisioning of the underlying network infrastructure. In contrast, a network with dynamically controllable QoS parameters allows individual application sessions to request network packet delivery characteristics according to their perceived needs. Moreover, it may provide different qualities of service to different applications.

For QoS-enabled IP-based networks, there are two main service streams, namely Integrated Services (IntServ) with its accompanying signaling (Resource) Reservation Protocol (RSVP) and "Differentiated Services" (DiffServ) as described in the article "An Architecture for Differentiated Services" (IETF RFC 2475, December 1998) by S. Blake, D. Black, M. Carlson, E. Davies, Z. Wang, and W. Weiss. Said differentiated services provide an aggregation of reservations for similar QoS data flows without any signaling. Therefore, DiffServ networks classify packets into one out of a small number of aggregated QoS data flows or "classes", based on the so-called DiffServ Code Point (DSCP).

The integrated services architecture mentioned above defines a set of extensions to the traditional best-effort (BE) model of the Internet with the object to provide applications with end-to-end QoS. The RSVP as described in the article "Resource Reservation Protocol (RSVP)—Version 1: Functional Specification" (IETF RFC 2205, September 1997) by R. Bradon et al. is an end-to-end control protocol which forms the signaling part of the integrated services architecture. The Internet Architecture Board (IAB) has outlined issues related to these two architectures which can be taken from the article "Next Steps for the IP QoS Architecture" (IETF RFC 2990, November 2000) by G. Huston.

RSVP is a signaling protocol that enables the applications to signal per-flow requirements to the network. Thereby, the reservation is receiver-oriented and the aggregation of said reservations is supported depending on the needs of the respective application. A QoS data flow may have multiple senders, and the protocol supports different reservation styles to dictate how to aggregate reservations for different senders. RSVP performs a simple reservation and maintains a soft-state resource management in the network. Two important message types used by RSVP are "PATH" and "RESV". Each data source periodically sends a "PATH" message that sets up the path state at the routers along the path from the sender to the receiver. The receiver of each QoS data flow periodically sends a "RESV" message which sets up a reservation state at intermediate routers along the reverse path from the receiver to the sender. Thereby, RSVP assumes a fairly stable path across the network.

The Mobile Resource Reservation Protocol (MRSVP) as described in the article "MRSVP: A Resource Reservation Protocol for an Integrated Services Network with Mobile Hosts" (Department of Computer Science, Technical Report, DCS-TR-337, Rutgers University, USA, July 1997) by A. K. Talukdar, B. R. Badrinath and A. Acharya supports two types of reservations: active and passive reservations: An active reservation corresponds to a QoS data flow over which data is actually exchanged. A passive reservation on the other hand corresponds to a flow in which the resources are reserved along the route, but data is not passing through. This leads to poor network utilization since reserved resources are not used. In this case, the bandwidth of the passive reservations can be used by other QoS data flows that might require weaker QoS guarantees or best-effort services. In general, a mobile host makes an active reservation to its current location and passive reservations to all other locations it might visit. After a successful handover procedure the active and passive reservations are exchanged.

QoS monitoring and adaptation can be understood as an enhancement of pure QoS reservation. INSIGNIA, an IP-based QoS framework as described in the article "INSIGNIA: An IP-based Quality-of-Service Framework for Mobile Ad-hoc Networks" (Journal of Parallel and Distributed Computing, Vol. 60 No. 4, pp. 374-406, April 2000) by Lee et al. is one candidate which supports adaptive services in mobile ad-hoc networks. This framework is based on an in-band signaling and a soft-state resource management approach that is designed to satisfy both mobility and end-to-end QoS requirements in dynamic environments, wherein network topology, node connectivity as well as end-to-end QoS are time-varying. Although INSIGNIA supports fast reservation, restoration, and end-to-end adaptation, it is not yet supported in any existing router implementation. Thereby, INSIGNIA is based on the "break before make" handover principle as it depends on the local routing protocol to reroute the flow traffic to the new access point and then try to restore the flow. In case of failure, the QoS service degrades to the "best-effort" service.

Another issue is the question whether a network state is soft or hard state. RSVP uses the concept of a soft-state resource management. As described in the article "Resource Reservation Protocol (RSVP)—Version 1: Functional Specification" (ETF RFC 2205, September 1997) by R. Bradon et al. and "RSVP: A New Resource ReSerVation Protocol" (IEEE Network, September 1993) by L. Zhang, S. Deering, et al., a soft state exists only as long as periodic messages are sent along the data path. If said messages fail to arrive at some nodes of said network, the soft state is removed. Compared to the soft state, the hard state is applied at the expense of more complicated releasing of resources, especially in the case of failures.

A context transfer protocol is used to transfer the state information of services, e.g. the QoS requirements of real-time applications, during handover from an old to a new access point. This exchange is triggered by so-called "handover indications" received from the data link layer (layer 2). The development of said protocol is part of the work of the IETF Seamoby working group (http://www.ietf org/html-.charters/seamoby-charter.html). Within this IETF working group, context transfers are discussed in a wider term, including security information and header compression as well as QoS-related information.

The article "A Framework for QoS Support in Mobile IPv6" (Internet Draft, Internet Engineering Task Force, March 2001) by H. Chaskar et al. discloses a solution to perform QoS signaling along the new network path when a mobile node using Mobile IPv6 acquires a new care-of address. The herein described solution is based on the definition of a new option called "QoS OBJECT OPTION". This option is included in the hop-by-hop extension header of certain packets, preferably the ones carrying binding messages, propagating between the mobile node and the correspondent node or between the mobile node and regional mobility agent(s). Such an approach takes advantage of mobility signaling inherent in Mobile IPv6 to program QoS forwarding treatment as well along the new network path. It naturally blends in with micro-mobility techniques.

In the proposal "QoS-Aware Handover for Mobile IP: Secondary Home Agent" (Internet draft, April 2000) by A. de Carolis et al., an extension to the Mobile IPv6 (MIPv6) protocol is disclosed that enables a mobile node to perform a so-called QoS-aware handover. It introduces a new mobile agent, the Secondary Home Agent (SHA), which allows the mobile node to establish a new QoS reservation before dropping the old one. The proposal thereby does not specify the method to solicit a Secondary Home Agent every time when the mobile node connects to an access router. Moreover, the proposal requests RSVP support and logical-flow duplication, e.g., PATH/RSVP messages duplication. An important assumption is that the mobile node must be able to activate the wireless link towards the new access router while still keeping the old one. The QoS-aware handover mentioned in the proposal can only be performed when the available QoS on the new link satisfies the current needs of the application. Otherwise, the QoS-aware handover procedure is not performed, and the current connection of the mobile node is maintained.

Besides, several QoS routing solutions are proposed for ad-hoc networks which are based on the data link layer (layer 2). These solutions do not only focus on finding a route from a source to a destination that satisfies the end-to-end QoS requirements but also on achieving the global efficiency in resource utilization. QoS requirements of QoS routing protocols are normally given in terms of certain constant bandwidth or delay.

Research and development efforts concerning iMAQ—an Integrated Mobile Ad-hoc QoS Framework—are based on building a cross-layer architecture to support the access and transmission of multimedia data via a MANET. Thereby, iMAQ is focused on the following aspects:

location management, providing location information of the mobile nodes, location-based QoS routing, computing routing path and forwarding data packets, small group communication, building an overlaying multicast tree for a group of mobile users, adaptive transport layer, providing router-assisted explicit adaptation for end systems, configuration management, distributing component-based application layer data processing, and data accessibility service, which includes advertising and replicating data to improve data accessibility.

The architecture involves cooperation between different layers at each mobile node to support multimedia traffic and adapt to changes in the dynamic mobile ad-hoc environment.

In this connection, it should be noted that the location-based QoS routing mechanism mentioned in this architecture is a measurement-based QoS-aware mechanism. The QoS of the data connection is maintained by monitoring the resource availability of the nodes in the network through location-resource updates. Thereby, only nodes with sufficient resources to support the data connection are used. Said mechanism predicts route breakage and predictively re-computes new routes before the existing connection over the old route breaks. However, the approach does not provide any hard QoS guarantees or resource reservation mechanisms.

A unified signaling and routing mechanism for QoS support in mobile ad-hoc networks is given by INORA—a QoS support mechanism based one the network layer. It is a routing protocol based solution, which presents an effective coupling between the INSIGNIA in-band signaling mechanism and a temporally ordered routing algorithm (TORA) for mobile ad-hoc networks. The aim is to establish a routing path which is the most suitable to provide QoS requirements for a flow. TORA thereby provides multiple routes between a given source and destination. The INSIGNIA signaling mechanism tries to make soft state reservation along the routing path chosen by TORA. When the current route fails to provide the QoS requirements INSIGNIA interacts with TORA for retrieving alternative routes. Furthermore, INORA makes use of feedback on a per-hop basis to direct the flow along the route-that meets the QoS requirements of the flow. In case admission control fails at an intermediate node, data packets are transmitted as best-effort packets from the source to the destination. The result is that there is no transmission interruption. On the other hand, no QoS guarantees are given.

Information dissemination as described in the article "Information Dissemination in Partitionable Mobile Ad Hoc Networks" (IEEE, October, 1999) by G. Karumanchi et al. is the principle process of replicating information at multiple nodes, and making some data available to a given number of mobile nodes within the network. This mechanism is well suited for spreading some information throughout mobile ad-hoc networks. The author indicates that a hybrid information management strategy and an absolute connectivity-based update trigger policy are particularly suited for partitionable ad-hoc networks.

A further well-known approach is based on the IPv4 Address Resolution Protocol (ARP) as described in the article "An Ethernet Address Resolution Protocol" (RFC-826, November 1982) by D. C. Plummer, which is well established within IPv4 networks. The protocol relies on a broadcast medium, e.g. the Ethernet. Every host has a small cache to save mapping information, and all hosts are synchronized within their status information. Thereby, no distinction is made between clients and servers.

The IPv4 Reverse Address Resolution Protocol (RARP) described in the article "Reverse Address Resolution Protocol" (RFC 903, Stanford University, June 1984) by R. Finlayson, T. Mann, J. Mogul, and M. Theimer also relies on a broadcast medium such as ARP. The difference is that RARP needs one or more server hosts, which respond to RARP requests generated from client hosts to maintain a database of mapping information. RARP is independent of the underlying technology and can be used for mapping hardware addresses to any higher-level protocol address.

The IPv6 Neighbor Discovery Protocol (ND) described in the article "Neighbor Discovery for IP Version 6 (IPv6)" (RFC 2461, December 1998) by T. Narten et al. extends and improves IPv4 ARP. It is embedded within ICMPv6 and defines new functionalities, such as "neighbor unreachability detection". To perform the neighbor discovery protocol, the node needs to have multicast-capable interface(s). The protocol performs only on addresses that are determined to be on-link; it never performs on multicast addresses. Furthermore, an unsolicited node does not need to create an entry in the cache when receiving a valid neighbor advertisement.

The IPv6 Inverse Neighbor Discovery Protocol (IND) described in the article "Extensions to IPv6 Neighbor Discovery for Inverse Discovery Specification" (RFC3122, June 2001) by A. Conta is the extension to IPv6 ND. It is initially developed for Frame Relay networks, or networks with a similar behavior. Thereby, an ND solicitation is sent as an IPv6 all-node multicast. However, on the data link layer (layer 2), it is sent directly to the target node—a directly connected remote node identified by the known link-layer address.

SHORTCOMINGS AND PROBLEMS OF THE PRIOR-ART SOLUTIONS

SUMMARY OF THE INVENTION

Within the last decade, different methods for enhancing QoS management in IP networks have been proposed, but unfortunately none of them are well suited for mobile ad-hoc network environments. Consequently, there is a strong need for modifications and adaptations to support the ad-hoc world.

One of the most significant problems within an ad-hoc network is that the routing path of a data flow and the QoS conditions of a communication connection might change over time quite frequently and significantly. Therefore, the data flow possibly has to be rapidly redirected, restored, adapted and released in response to wireless environment impairments and topology changes. Nowadays, the prevailing QoS protocols according to the state of the art are not well suited to such a dynamic mobile wireless environment. Instead of proactively probing the QoS situation of the potential future routing path, they react in a more passive and reactive way to the QoS condition changes caused by handover processes.

Handover initiation procedures according to the state of the art are often based on monitoring the strength of a received signal (RSS). The neighboring candidate of a mobile node with the strongest RSS will be selected as the handover target node. Based on the selection result, a handover procedure is performed on the data link layer. The mobile node releases the current connection and establishes a new connection to the respectively selected handover target node. After the link layer handover has been processed, the network layer handover procedure is activated. When the handover target node has taken full responsibility for the data packet forwarding generated by the mobile node, the handover process is finished.

The above-mentioned handover process only covers the RSS signal for its handover decision database. The problem that comes up for real-time applications is that the RSS signal is often not sufficient to support enhanced QoS needs. In other words, the node with the strongest RSS could be not the best potential handover target node with respect to the required QoS needs. In an optimized QoS-aware handover process not only the received signal strengths of the handover candidates, but also the QoS capabilities along the routing paths towards these candidates should be the basis of any evaluation (see FIG. 3). The node with the strongest RSS could have very poor QoS capabilities, which excludes it from being a reasonable handover target. From the real-time application point of view, QoS capabilities of the handover candidate could be more important than its RSS indication. Therefore, an effective QoS metric probing mechanism is essential to reach the goal of a QoS-aware handover.

In addition, most of the existing prior-art approaches do not incorporate the advanced QoS support offered by adaptive real-time applications.

Current existing address resolution protocols, e.g. the IPv4 Address Resolution Protocol (ARP) and the IPv4 Reverse Address Resolution Protocol (RARP), the IPv6 Neighbor Discovery Protocol (ND) and the IPv6 Inverse Neighbor Discovery Protocol (IND), are initially designed in the context of fixed networks without covering enhancements of mobile ad-hoc networks. Owing to unstable network conditions found in ad-hoc networks, established connections (see FIG. 1) are quite unreliable. These unreliable connections will lead to an unpredictable packet loss that in turn will affect the execution of ND/IND protocols. Furthermore, due to the multicast nature of the ND/IND protocols, said packets are not only sent to a single receiver. Packet loss within a multicast communication multiplies the negative effect of lost ND/IND signaling information. Some mobile nodes have technical limitations of simultaneous connectivity. In case such a mobile node needs to send or receive packets among its neighbors, frequent handovers among these neighbors are inevitable. This results in long delays for a successful execution of the ND/IND process.

In view of the explanations mentioned above, it is the primary object of the present invention to propose technique to accomplish an efficient QoS-aware handover.

This object is achieved by means of the features of the independent claims. Advantageous features are defined in the dependent claims. Further objects and advantages of the invention are apparent in the detailed description which follows.

The proposed solution of the present invention is basically dedicated to a QoS-aware handover procedure in a typical dynamic mobile ad-hoc scenario wherein the connectivity of the applied devices is unpredictably time-varying and, due to the mobility of mobile nodes, handovers will inevitably frequently occur. Thereby, resources are pre-allocated along potential routing paths in advance, and the flow traffic is redirected to the path having the best available QoS capabilities. According to the new QoS situation of the selected path, adaptive realtime applications can have the opportunity to adjust traffic generation. With this concept, packet loss can be avoided and degradation effects on the running real-time application during the QoS-aware handover can be minimized. The handover procedure thereby comprises the steps of handover candidates selection, handover initiation, QoS metrics probing as well as resource pre-allocation (soft reservation), QoS metrics collection, handover decision, handover confirmation (hard reservation), and reservation release.

In particular, the proposed solution thereby pertains to a method for proactively probing the QoS situation of each potential routing path, pre-allocating resources along the best available QoS path in advance before the handover of a data flow to be transmitted to a new access point begins, providing efficient resource reservation management and maintenance in the mobile ad-hoc networks and incorporating the advanced QoS support features offered by adaptive real-time applications.

Furthermore, the invention proposes an "information dissemination" approach which optimizes prior-art address resolution mechanisms. In the context of the so-called MAC-IP Address Mapping Implementation (MIAMI), the invention can be advantageously applied to solve the following problems:

Pro-actively propagating address-mapping information in a mobile ad-hoc environment: This proactive information dissemination increases the availability of address resolution data. The solution results in a decreased usage of existing address resolution protocols. This in turn will finally shorten the delay in session setup and minimize the signaling overhead in the dynamic mobile wireless environment.

Advanced address resolution support to mobile nodes without multicast-capable interfaces: This is achieved by offering an expanded, local address resolution cache.

ND/IND protocols: In ND/IND protocols, the address to be resolved must be "on-link" to the soliciting node, which means that the communicating parties have to support the same access technology. Nowadays, mobile nodes could have more than one interface based on different technologies. The aforementioned approach of information dissemination will enhance address resolution protocols by overcoming the limitation of a homogeneous access technology.

In the following, a number of prerequisites shall be briefly mentioned which are necessary for the proposed solution:

Resource-aware application: Resource-aware applications, which proactively monitor and control the utilization of the underlying platform, can ensure a desired performance level by adapting themselves to changing resource characteristics.

Network topology: Topology changes of mobile ad-hoc networks should be quite stable during the handover period. On this assumption, the monitored QoS metrics or parameters are relatively stable during the entire handover process.

Mobility protocol: A mobility protocol solution has to be available that supports a fast handover. As described in "Mobility Related Terminology" (Internet Draft, Internet Engineering Task Force, IETF, July 2001) by J. Manner et al., a fast handover approach primarily aims to minimize delay without an explicit interest in packet loss.

Handover trigger: While moving around in a field of access points, the mobile node should analyze the situation to handover to the next access point for keeping an optimal wireless connection. Therefore, there is the need for a quality-monitoring unit triggering the data link layer (layer 2). Said data link layer triggers should be located in the mobile node due to the fact that the mobile node is the most suitable unit to measure the actual link quality to the potential reachable access points. Thereafter, the upper layers can be informed by the trigger event to initialize a planned handover. In addition, events from the network layer (layer 3) can also be used to trigger the handover process for the purpose of searching for better QoS support.

BEACON signal: The mobile node keeps listening to data link layer (layer 2) BEACON signals sent by its neighbors. The BEACON signal will disseminate MAC address of the origin. In case the address mapping information can not be resolved from the local cache, the mobile node has to resolve the address with the help of any address resolution protocol, e.g. the IPv6 Neighbor Discovery Protocol (ND) or the Inverse Neighbor Discovery Protocol (IND), respectively.

IP protocol: The IPv6 protocol described in "Internet Protocol, Version 6 (IPv6) Specification" (IETF RFC 2460, December 1998) by S. Deering and R. Hinden has to be available.

QoS monitoring: The QoS model should be able to monitor the actual QoS capabilities on the data link layer (layer 2). This information can then be offered to adaptive real-time services.

Reservation management: The data link layer (layer 2) must be able to process QoS requests, e.g. soft or hard resource reservation requests, generated by the QoS model.

BRIEF DESCRIPTION OF THE DRAWINGS

Further advantages and embodiments of the present invention result from the subordinate claims as well as from the following detailed description of the invention as depicted in the accompanying drawings:

FIG. 9 is a structure of a QoS table stored in an network unit, FIG. 37 shows the structure of the IPv6 option for the MIAMI solution (the so-called "MIAMI Option Structure").

DETAILED DESCRIPTION OF THE PREFERRED EMBODIMENTS

Figure 1:
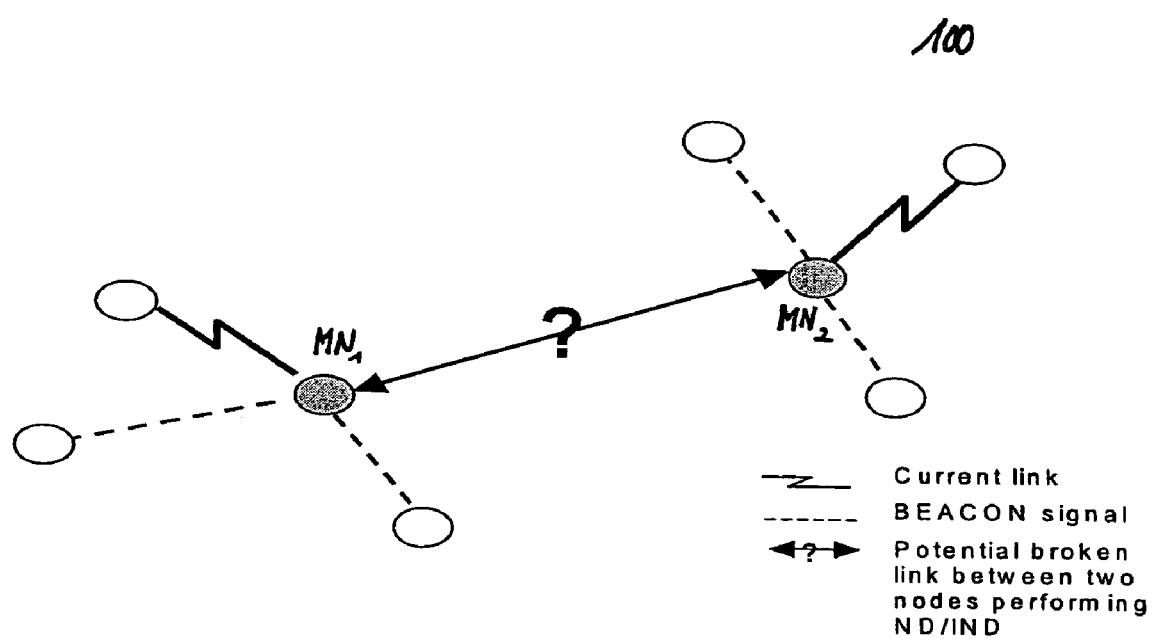
FIG. 1 shows a situation where the wireless link between two wireless nodes performing the IPv6 Neighbor Discovery (ND) or Inverse Neighbor Discovery (IND) protocol is possibly broken.

In the following, the preferred embodiment of the present invention as depicted in FIGS. 1 to 37 and the particular steps of the handover procedure according to the present invention shall be explained in detail. The meaning of the symbols designated with reference numerals and signs in these figures can be taken from Table 2.

1. Handover Candidates Selection

The proposed QoS-aware handover procedure is designed to be independent of access technologies based on the data link layer (layer 2). It can be triggered by data link layer (layer 2), network layer (layer 3) events or an explicit request generated by an application.

The quality of a wireless connection mainly depends on a factor indicating the strength of a received signal (RSS). It shall be presumed that aside from the MAC address a low-level parameter indicating the link quality (such as RSS) is submitted within the received BEACON signals. Based on these BEACON signals, a mobile node MN is capable of monitoring its neighbors while keeping the current connection. This data updates an active candidate cache within the mobile node MN that holds a list of all potential handover candidates with the corresponding RSSs. Once the RSS of a neighbor is stronger than a reference threshold, the node will be added in the cache. If the RSS of a node is below a certain "remove" reference threshold for a certain period of time, this node entry will be removed from the cache.

Figure 2:
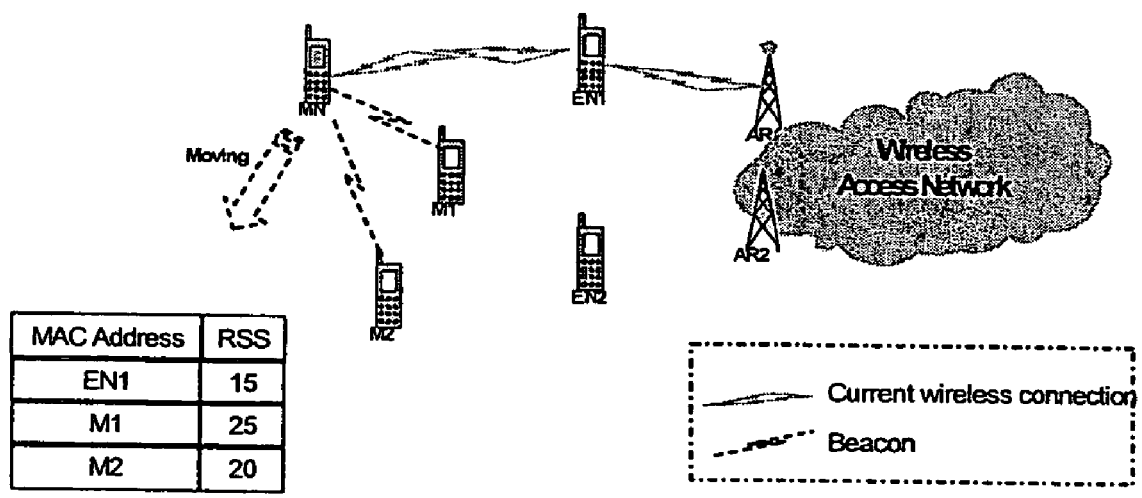
FIG. 2 shows a handover candidate selection scenario in a wireless ad-hoc network environment, wherein a mobile node MN does not only keep the current connection, but also listens to BEACON signals transmitted by the mobile nodes M1 and M2.
Figure 3:
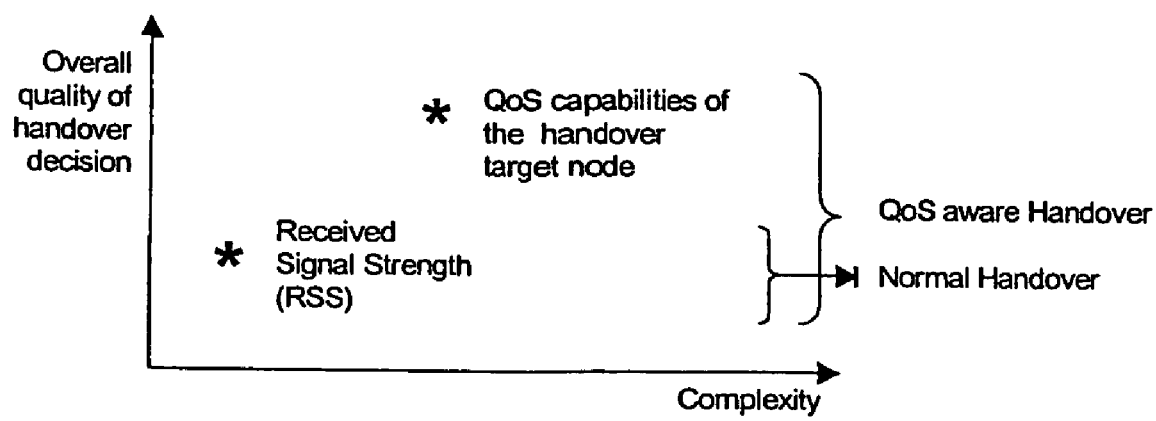
FIG. 3 shows different parameters considered in a normal handover process (the strength of a received signal) and a QoS-aware handover process (the strength of the received signal and the QoS capabilities of the handover target node)

FIG. 2 shows a scenario where a mobile node MN is leaving the covering range of its current connection (MN/EN1). At a certain stage, the current wireless link between MN and its one-hop neighbor EN1 turns to be unstable. The MN detects that the RSS of the current connection with EN1 drops below the "remove" threshold for a certain period. This event initiates the handover process, which is defined by the following steps:

Node EN1 is removed from the candidate cache of MN.

All potential handover candidates that indicate "stable" strong RSSs over the "add" threshold are submitted as candidates to the QoS-aware handover unit.

The QoS capability of these candidates are probed and the final handover target node are selected.

The QoS-aware handover procedure can also be triggered by network layer (layer 3) events. For example, MN analyzes the QoS situation to handover to a more "promising" access node having the potential capabilities to optimize the expected network layer performance in the future.

2. Handover Initiation

Figure 4:
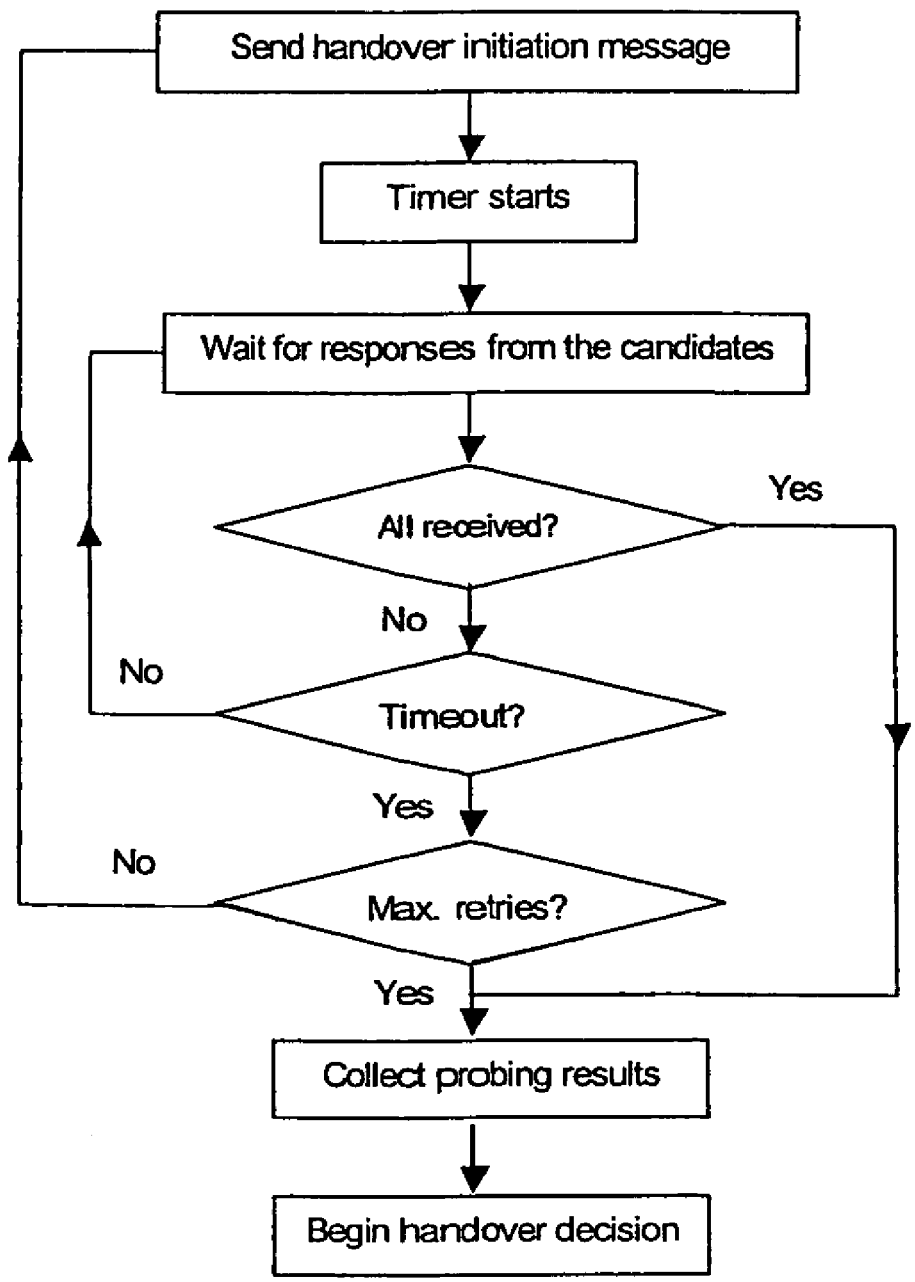
FIG. 4 is a flow chart showing the operations on the mobile node MN activated by the handover initiation event after sending the "Handover Initiation Message"
Figure 5:
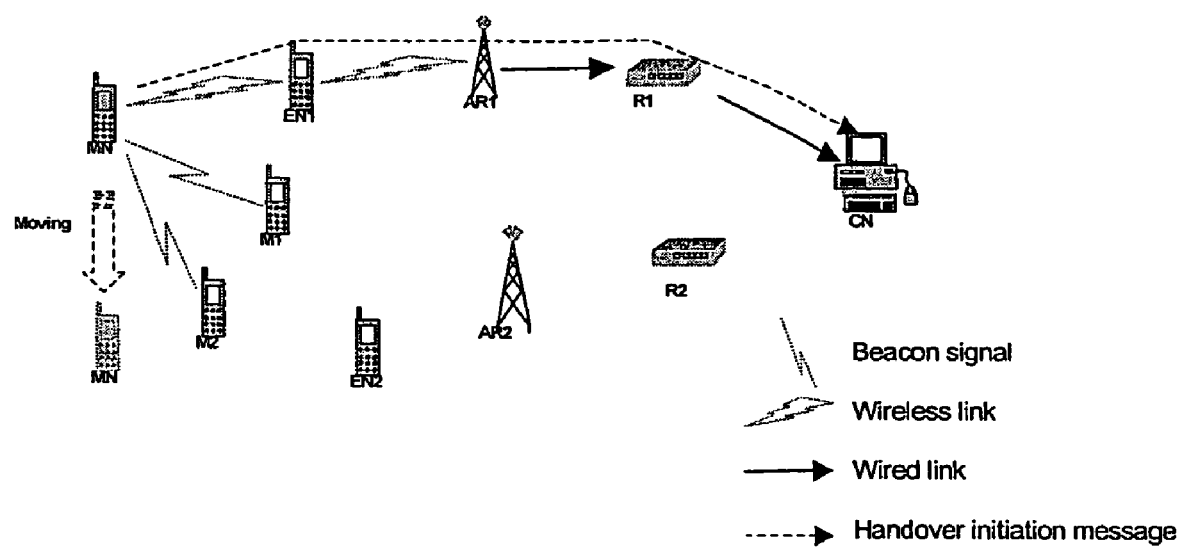
FIG. 5 shows a mobile node MN sending a "Handover Initiation Message" to its correspondent node CN in order to activate a QoS capabilities probing procedure within the correspondent node CN.
Figure 6:
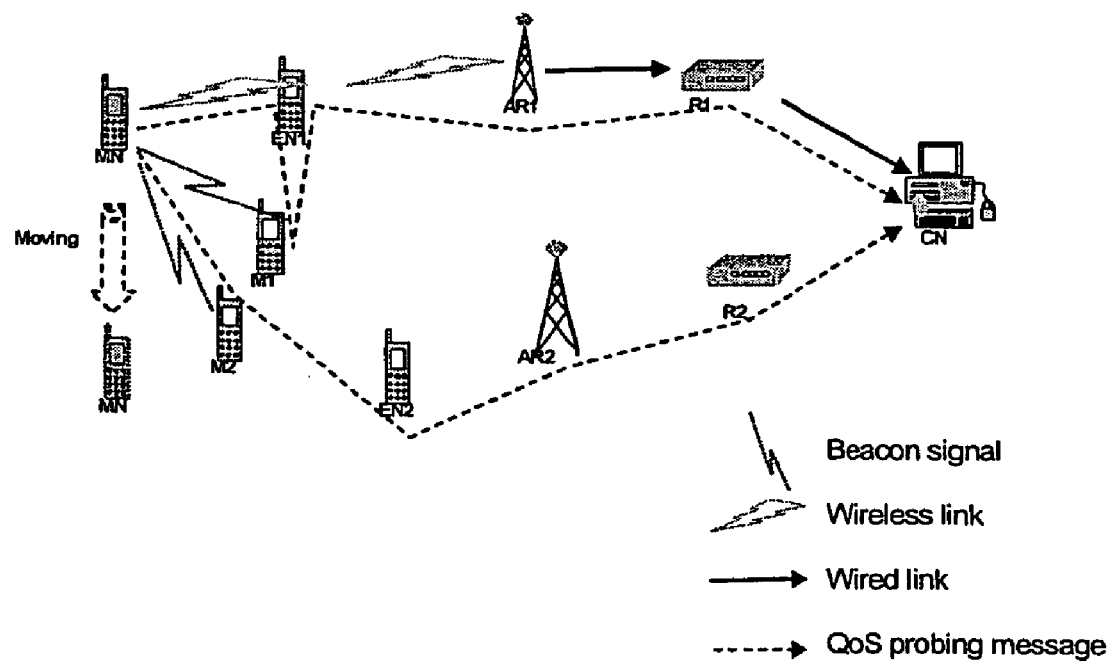
FIG. 6 shows a scenario where the mobile node MN is in charge of possessing a QoS probing by initiating a "Handover QoS Metrics Probing Message"
Figure 7:
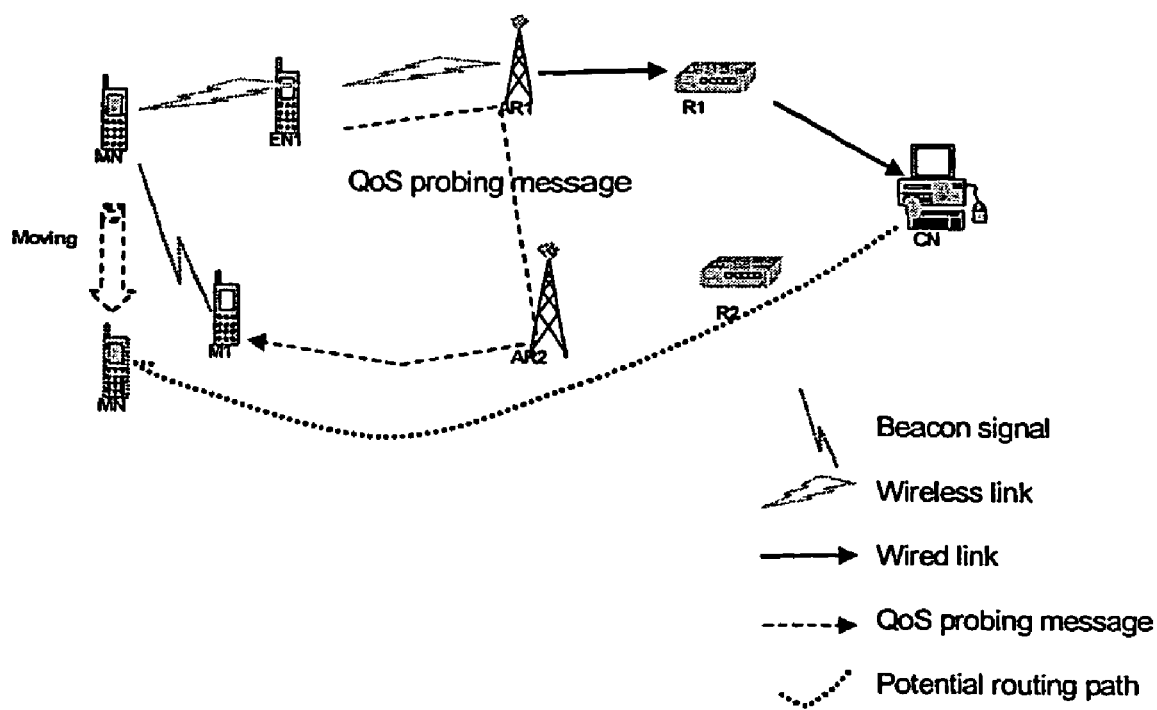
FIG. 7 shows a scenario where a one-hop neighbor EN1 of the mobile node MN is in charge of possessing the QoS probing by initiating the "Handover QoS Metrics Probing Message"

FIG. 4 shows the reaction scheme running on the mobile node MN activated by the handover initiation event. First, the mobile node MN sends a "Handover Initiation Message" (1600), which includes four types of option data, to the correspondent node (CN) (see FIG. 5). Thereby, the information contained in the "flow ID" field, the address of a potential handover candidate, and the address of the target node (taken as a destination indication for the candidate node for the resource reservation evaluation) are obligatory. In case of new QoS requirements, "QoS metrics" information can optionally be filled in.

After MN has sent the "Handover Initiation Message" (1600) as shown in the flow chart depicted in FIG. 4, it waits a certain amount of time for responses from a number of potential handover candidates. If no or not all responses are received within a defined period, the mobile node MN re-sends the "Handover Initiation Message" to the correspondent node CN re-probing the unresolved candidates. When a maximum retry count has been reached, MN stops re-sending the "Handover Initiation Message". According to the replied probing results, the mobile node MN selects its preferable handover candidate.

In case no responses from any candidates are received, the "QoS-aware handover" fails. As a fallback strategy, a normal handover process is performed. After that, the candidate node having the strongest RSS is selected as handover target node.

It should be mentioned that the mobile node MN does not perform "direct" probing of QoS capability towards each candidate. Instead, it uses the "Handover Initiation Message" in order to activate the correspondent node CN to perform the QoS probing procedure. In the following, the reason for this reaction scheme shall be explained:

Mobile ad-hoc networks are characterized by frequent changes of their network topology. The conditions of a wireless link are unstable and bandwidth-constrained. In addition, the mobile node has to deal with battery power limitations and low processing capabilities. In such a dynamic environment processing load on mobile nodes should be minimized.

In case a mobile node is in charge of probing the QoS capability (see FIG. 6), it has to generate separate probing messages to all potential handover candidates. This behavior is based on the limitation that the mobile node cannot establish more than one connection (within the "direct mode") at a time. Sequential independent handover processes have to be performed to disseminate QoS probing packets to the different handover candidates. However, this sequential "direct" QoS probing handled within the mobile node MN causes delay and processing overheads.

Within the QoS-aware handover approach, QoS probing activities handled by the one-hop neighbor of the mobile node MN should be avoided due to the following reasons:

A one-hop neighbor of the mobile node MN in the ad-hoc networks could be a mobile node with all its above-mentioned limitations (e.g. constraint battery power, processing capability and simultaneous connectivity).

Based on an end-to-end consideration, QoS probing results initiated by a one-hop neighbor disregard end-to-end routing decisions. To give an example (see FIG. 7), the one-hop neighbor EN1 of MN is considered probing the QoS capability of each candidate. The result probed by EN1 along the path to each handover candidate, e.g. M1-AR2-AR1-EN1, does not reflect the end-to-end QoS situation of the potential routing path CN-R2-AR2-M1 from the correspondent node CN to the mobile node MN via the handover candidate M1.

3. QoS Metrics Probing and Resource Pre-Allocation

Figure 8:
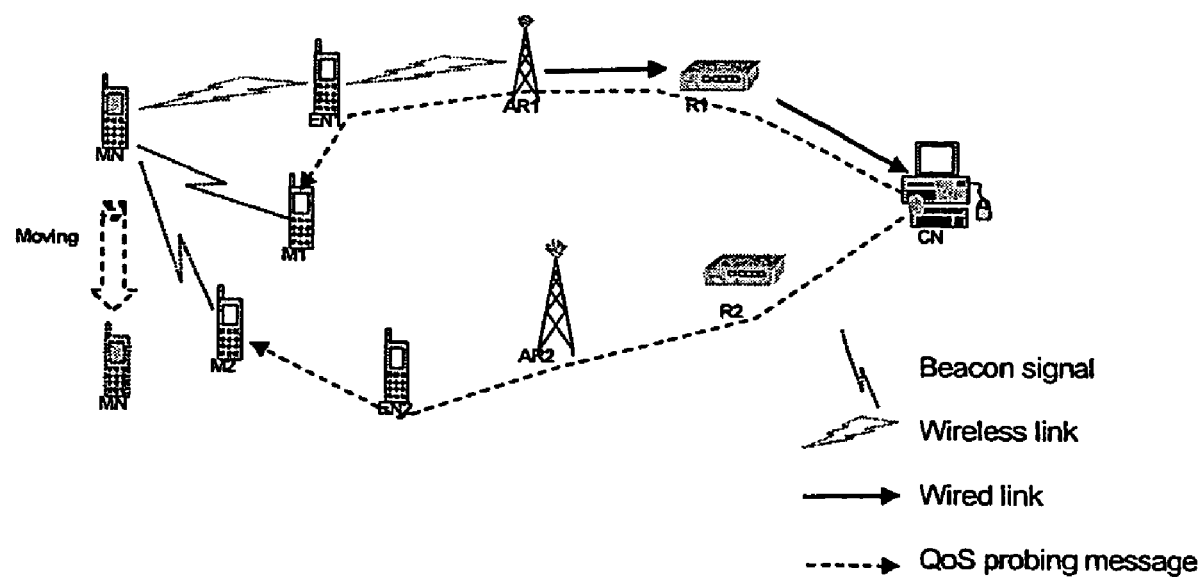
FIG. 8 shows a scenario where the correspondent node CN is in charge of possessing the QoS probing by initiating the "Handover QoS Metrics Probing Message"

In the previous section it is illustrated why the correspondent node CN should be in charge of probing the QoS metrics of each handover candidate. In this scenario as depicted in FIG. 8, CN starts the QoS probing procedure after receiving the "Handover Initiation Message" sent from MN.

Based on the underlying routing protocol, "Handover QoS Metrics Probing Messages" (1700), which are generated by the correspondent node CN, are transferred towards each handover candidate node. During this process, the QoS metrics along the routing path are analyzed to update related parts of the "Handover QoS Metrics Probing Message" accordingly.

For the new path selection no restrictions are claimed. The path creation process can use parts of the old routing path or follows routing decisions where none of the nodes on the new path is a member of the currently established path.

Unlike the "Handover Initiation Message" (1600), which is embedded in an IPv6 destination options header, the "Handover QoS Metrics Probing Messages" (1700) is transferred within an IPv6 hop-by-hop options header. The probing message contains the flow ID information and the associated QoS requirements of the running adaptive real-time application.

The message probes the availability of the QoS capabilities along each potential routing path. In case of sufficient capabilities, a soft reservation for the handled flow is activated within the actual node.

In addition, the actual node stores the path history data retrieved from the "Address Option" field (see FIG. 15), which is embedded in the "Handover QoS Metrics Probing Messages" header.

Upon receiving such a "Handover QoS Metrics Probing Messages", the intermediate node checks the flow ID in the message against its local cached "QoS Table" (900), whose main attributes shall now be described:

- The flow label and source address of the flow are combined as "Flow ID" to identify each flow. Please note that the "Flow ID" remains unchanged during the lifetime of its associated flow and should be independent of the flow identifier and the IP addresses of the flow end-points. Therefore the combination of the flow label and source address should be understood as one option to generate a "Flow ID" out of a pool of creation alternatives.
- The neighbor address is the source address where the "Handover QoS Metrics Probing Messages" (1700) has been sent. This field is used for saving the routing path history.
- Maximum (Max. BW) and minimum bandwidth (Min. BW) in the "QoS Metrics" option are the QoS requirements of the associated running real-time application.
- The sum of hard-reserved (HR) and soft-reserved (SR) resources describes the total current resource reservation for a specific flow.
- All reservations are managed as soft-state reservations. The timer field is in charge of holding the soft-state information. Based on this information, soft-state timeout events are generated to release reserved resources.
- The indicator field in the "QoS Table" shows if the QoS requirement of a flow is fulfilled.

Figure 10:
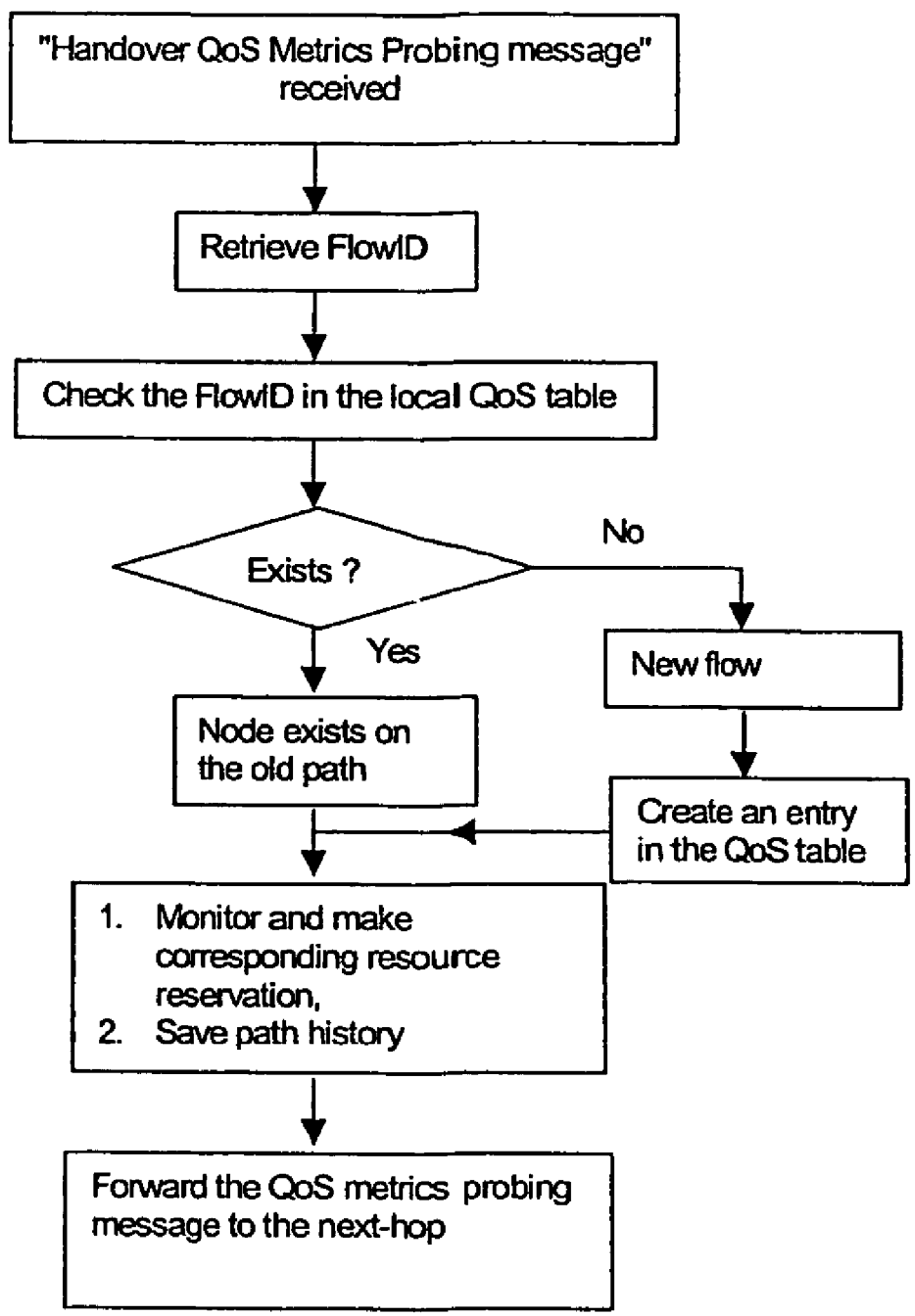
FIG. 10 is a flow chart showing the QoS metrics probing message processing, which describes the operations of one node after receiving the "Handover QoS Metrics Probing Message"

The processing of a "Handover QoS Metrics Probing Message" is illustrated in FIG. 10. In case a QoS entry with the same flow ID already exists in the "QoS Table", the node analyzes the local QoS situation for a potential QoS capability "upgrading" or "downgrading". In case the flow ID does not exist within the local "QoS Table", the node creates an entry for this flow in the "QoS Table" (900). In addition, a corresponding soft reservation is activated for the flow according to the QoS requirements and current local QoS capability situation.

The address stored in the "Address Option" field (see FIG. 15), which is embedded in the "Handover QoS Metrics Probing Message" (1700), indicates from which one-hop neighbor this probing message has been sent. To keep the path history, this address information is stored in the local "QoS Table". While the intermediate node is forwarding the message to the next hop, it replaces the "Address Option" with its own address.

Finally, the candidate node (e.g. M1 or M2) receives the "Handover QoS Metrics Probing Message" initiated by the correspondent node CN. The candidate node processes the message in the same way as the intermediate node. The path history is saved and the corresponding resource is soft-reserved for the flow towards the target node of the candidate. For this operation the necessary address information of the target node of the candidate can be retrieved from the "Address Option" field.

The candidate node is now holding the complete knowledge about the actual QoS situation on the new potential routing path from the correspondent node CN via itself towards the mobile node MN.

4. Handover QoS Metrics Collection

Figure 11:
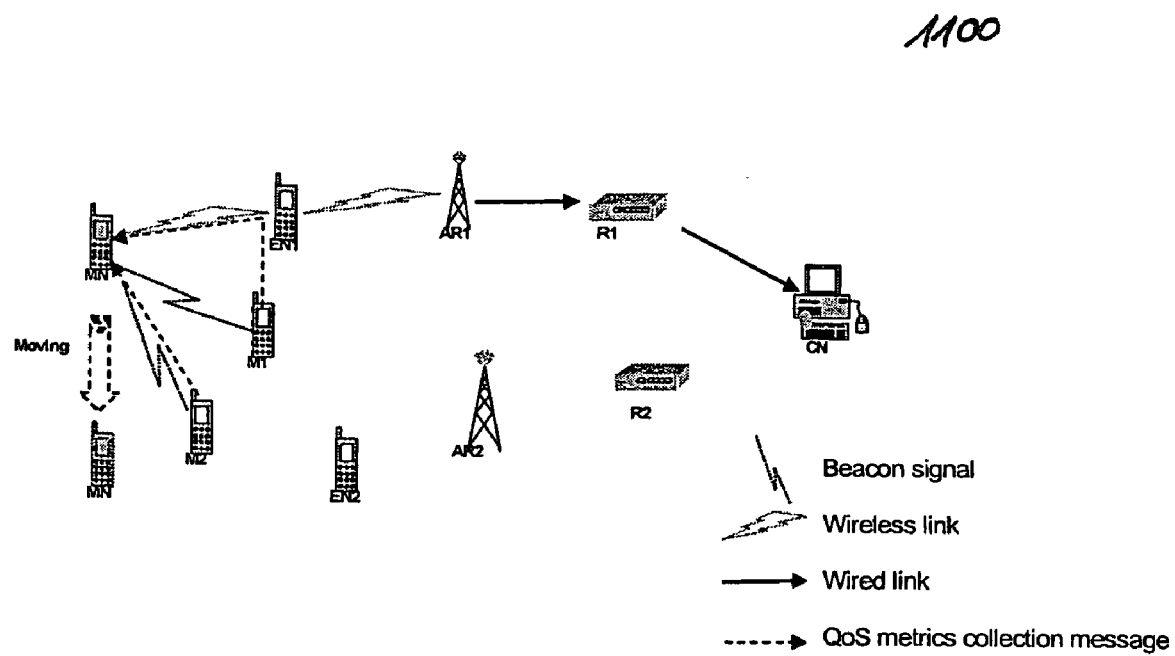
FIG. 11 shows a scenario of sending "Handover QoS Metrics Collection Messages" from candidates to the mobile node MN as a basis for handover decision.
Figure 12:
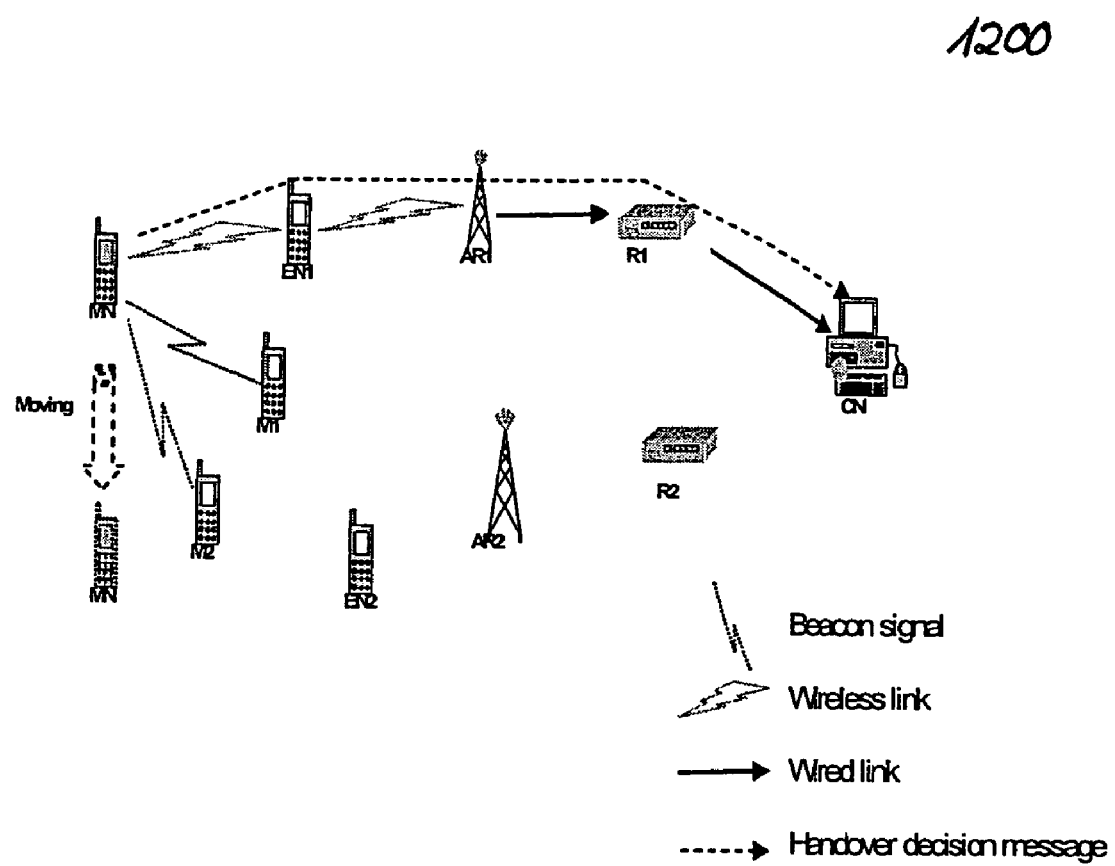
FIG. 12 shows a handover decision procedure, wherein the mobile node MN decides for a handover target node according to the QoS probing results.

After each handover candidate node has processed the received "Handover QoS Metrics Probing Message" (1700), it replies the result to the mobile node MN (see FIG. 11). The reply message is defined as a "Handover QoS Metrics Collection Message" (1800). This message is similar to the "Handover Initiation Message" (1600), which uses the IPv6 destination options header to inform the mobile node MN of each candidate's QoS capability.

The "Handover QoS Metrics Collection Message" could be sent to the mobile node MN along any routing path. For the respectively selected forwarding path there are no restrictions. The packets can be either transferred via a direct connection or forwarded by other mobile nodes.

5. Handover Decision

When the mobile node MN receives the "Handover QoS Metrics Collection Message" (1800) from each candidate (e.g. M1 and M2), it will have collected the knowledge about the QoS capability that can be provided by each candidate. Based on these QoS monitoring results, the mobile node MN computes its handover target node decision. The handover target node which offers the "best" available QoS metrics on the routing path will be selected.

If the probed QoS capability provided by the handover target node is different from the value of the current routing path, the associated running real-time application should be informed with the help of the "Handover Decision Message" (1800). The reaction scheme of announcing future QoS capabilities is necessary to inform the real-time application about the upcoming handover event and the expected throughput along the future new routing path. This offers the real-time application the necessary time to adapt to the upcoming QoS capability changes before the handover procedure on the data link layer itself is processed (see FIG. 12).

According to the invention, the "Handover Decision Message" is similar to the "Handover Initiation Message" (1600). It informs the real-time application running on the correspondent node CN to adapt to the upcoming QoS capabilities. This adaptation process is necessary for traffic load situations where the real-time application traffic exceeds the future throughput capabilities of the link. This leads to an overload of the link and causes flow interruption and packet loss.

There is no need to inform the real-time application about an upcoming handover event in case the new routing path provides the same QoS capabilities compared to the current path. The handover process is transparent to the higher layer.

6. Handover Confirmation

Figure 13:
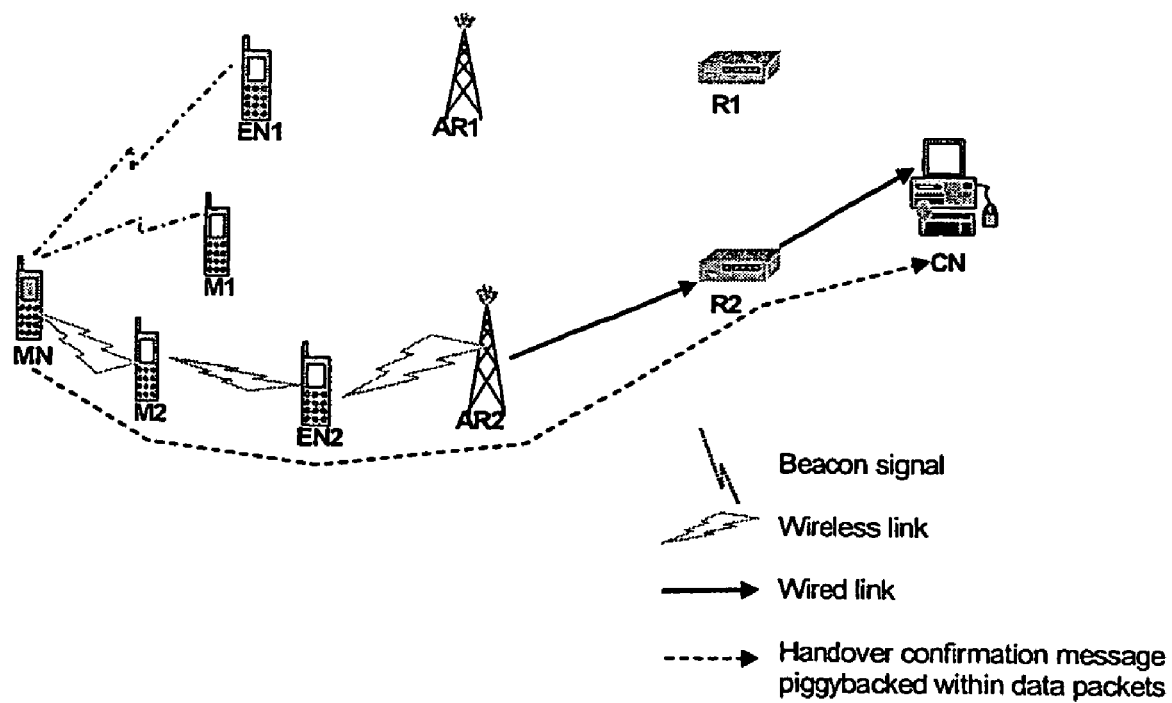
FIG. 13 shows a handover confirmation procedure, wherein a hard reservation message is sent from the mobile node MN to the correspondent node CN in order to change the state of the reserved resources from soft reservation (SR) to hard reservation (HR)

As shown in FIG. 13, the mobile node MN releases its current wireless connection with EN1 and builds a new connection with M2. To confirm this process, a "Handover Confirmation Message" (1900) with an embedded bandwidth request is sent piggybacked within the traffic from the mobile node MN via M2 to the correspondent node CN. This "Handover Confirmation Message" is transmitted hop-by-hop similar to the "Handover QoS Metrics Probing Message"

(1700). With this "Handover Confirmation Message" used as hard reservation message (HR), the soft reservation on the new path from the mobile node MN via M2 to the correspondent node CN will be switched to hard reservation. When the correspondent node CN receives the "Handover Confirmation Message", the QoS-aware handover has been completed.

7. Release of Outstanding Reservations

Figure 14:
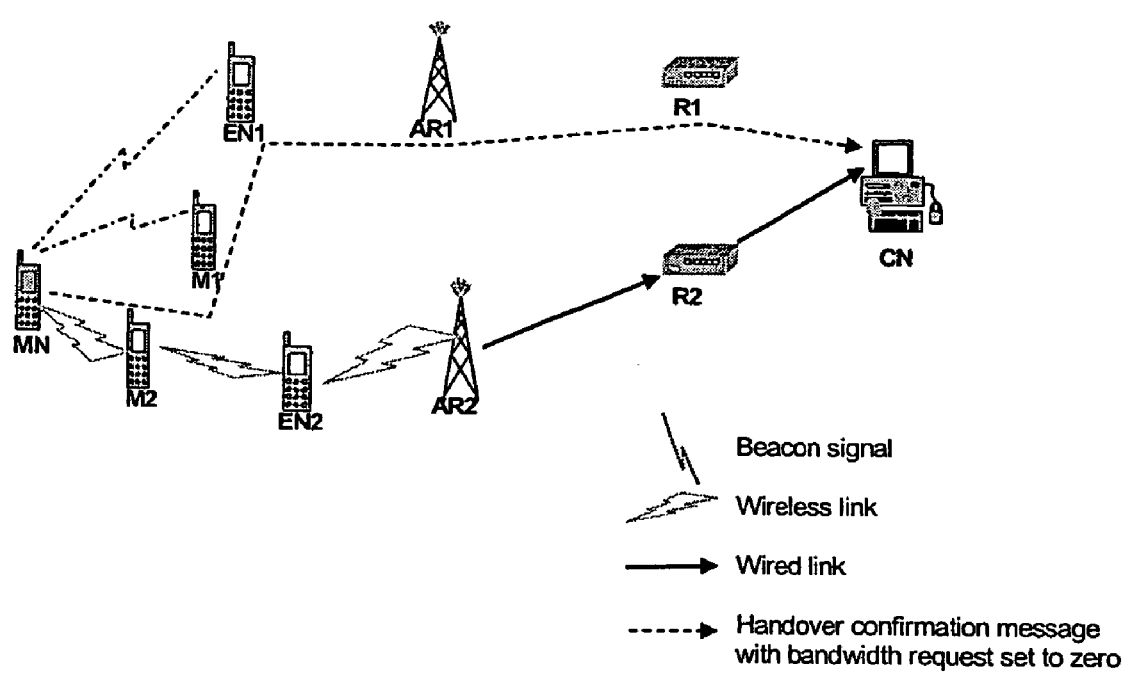
FIG. 14 shows a scenario where a hard reservation message with a bandwidth request set to zero is sent along the old communication path and a non-selected potential routing path to release outstanding reservation (outstanding reservation release)

To avoid resource wasting, outstanding reservations should be released as soon as possible. As shown in FIG. 14, the hard-reserved resource on the old path (from the mobile node MN via EN1, AR1, and R1 to the correspondent node CN), and the soft-reserved resource on other probed routing path (from EN1 via M1 to the mobile node MN) should be released after the handover has been processed.

Two solutions are proposed to release outstanding reservation. The first one is to send an explicit resource release message. The "Handover Confirmation Message" (1900) can also be used as the explicit resource release message, wherein the bandwidth request is set to zero. The second approach thereby follows the concept of "soft state" management. No extra signaling is needed. The outstanding reservation will be released based on the internal soft state timer of each node.

Figure 15:
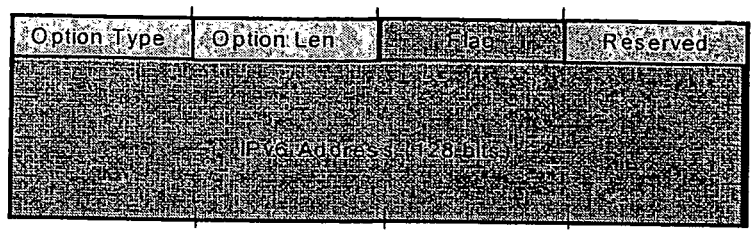
FIG. 15 shows the structure of the newly defined IPv6 "Address Option" field for the QoS-aware handover.

The IPv6 "Address Option" field defined for the "QoS-aware handover" is shown in FIG. 15. Each IPv6 "Address Option" field thereby includes the following fields:

Option Type: An 8-bit identifier that specifies the type of the "Address Option".

Option Length: An 8-bit unsigned integer field, which defines the length of the "Address Option" in bytes.

IPv6 address field: A 128 bits IPv6 address.

Flags: An 8-bit unsigned integer field that indicates the different styles of the included IPv6 address:

(1) a target node address (T), used in the "Handover Initiation Message" (1600), and a "Handover QoS Metrics Probing Message" (1700) to indicate the respective candidates to which node they should soft-reserve the requested resources.

(2) a candidate node address (C) used in "Handover Initiation Message" (1600) to inform the message receiver, e.g. the correspondent node CN, to which node the receiver should send out the probing messages.

(3) a sending node address (S) used in the handover QoS metrics probing procedure. This field is updated hop-by-hop by each node along the path to save the path history of the potential route through the network.

FIGS. 16 to 19 illustrate the formats of all messages used in the QoS-aware handover procedure according to the present invention. These messages are named according to their functionality.

Figure 16:
FIG. 16 shows the format of the "Handover Initiation Message" which are embedded within an IPv6 destination options header.

FIG. 16 shows the format of the "Handover Initiation Message", which is generated by the node triggered by the handover event (e.g. the mobile node MN) and sent to the correspondent node (e.g. the correspondent node CN). The addresses of the potential handover candidate and the target node addresses for this handover candidate stored in the two "Address Options" fields will be used by the correspondent node CN to build the "Handover QoS Metrics Probing Messages".

The QoS-aware handover solution is not specific to a source- or sink-driven signaling approach. The MN can either be the source node or the sink node of the flow. In case the mobile node MN is the source node of the flow, in-band signaling is applied, and the options can be piggybacked within the data packets. In case the mobile node MN is the sink node of the flow, a separate message should be built and sent out.

Figure 17:
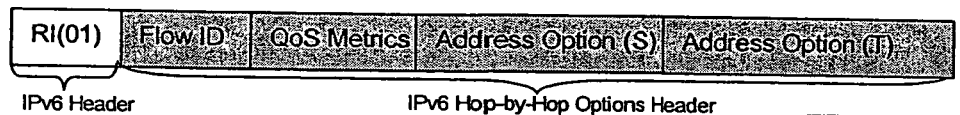
FIG. 17 shows the format of the "Handover QoS Metrics Probing Message" embedded within an IPv6 hop-by-hop options header.

The format of the "Handover QoS Metrics Probing Message" is depicted in FIG. 17. The message is generated by the correspondent node CN and transmitted along the path selected by the routing protocol towards each potential handover candidate. Each node receiving the message processes the corresponding QoS reservation according to the QoS requirements embedded in the "QoS Metrics" option.

The "Handover QoS Metrics Probing Message" includes two types of "Address Options". The first "Address Option" with the type "S" (cf. FIG. 17) is updated hop-by-hop, to save the path history. The second "Address Option" with the type "T" (cf. FIG. 17) is only used to inform the potential handover candidate to which node the resource should be reserved.

Figure 18:
FIG. 18 shows the format of the "Handover QoS Metrics Collection Message" and the "Handover Decision Message" which are embedded within an IPv6 destination options header.
Figure 19:
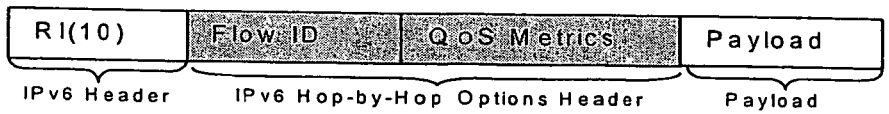
FIG. 19 shows the format of the "Handover Confirmation Message" embedded within an IPv6 hop-by-hop options header.

FIG. 18 shows the format of the "Handover QoS Metrics Collection Message" and the "Handover Decision Message". The former message is used by the potential handover candidates to inform the mobile node MN about the QoS capabilities along the potential routing path. The later message is used by the mobile node MN to inform the correspondent node CN about upcoming QoS capabilities that can be expected after the handover has been processed.

After the mobile node MN has established the new connection with the selected handover target node, the "Handover Confirmation Message" (1900) is sent along the new routing path to the correspondent node CN. The soft-reserved resource along the path is changed to a "hard reservation" state. Whenever it is beneficial, these options will be piggybacked within the data packet.

Figure 20:
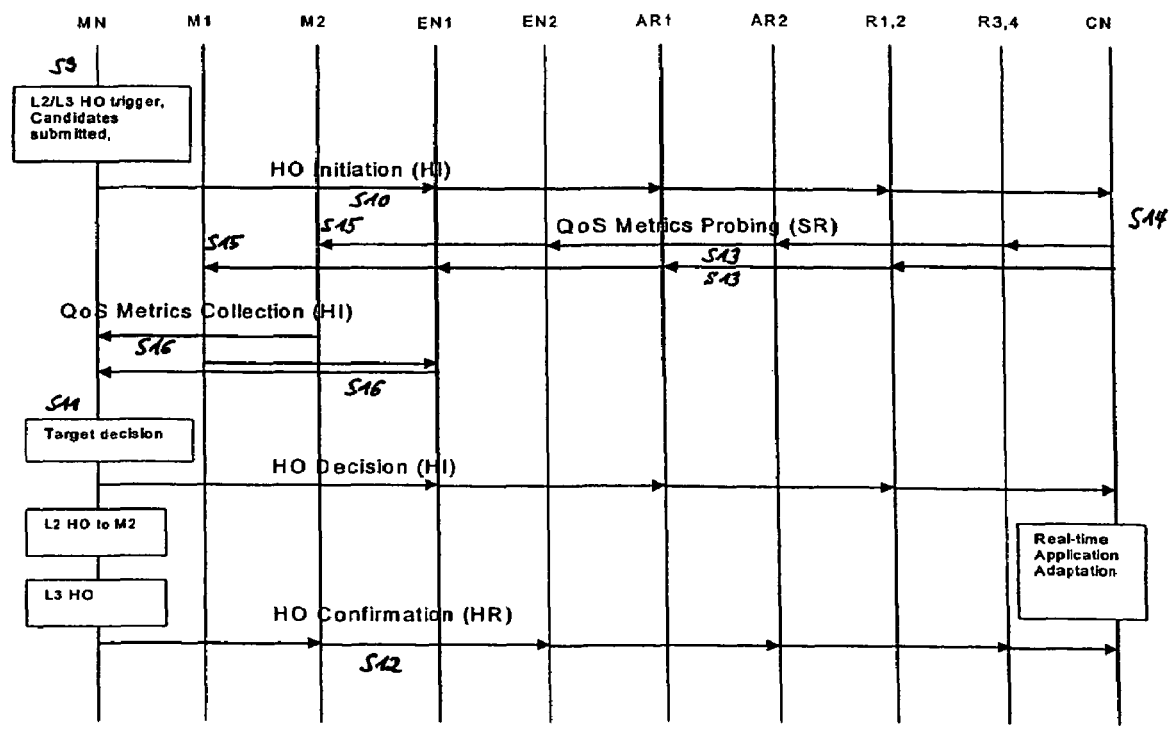
FIG. 20 is an interaction diagram showing the signaling of an "End-to-End QoS-Aware Handover" procedure and the interactions between the mobile node MN, the handover candidates M1 and M2, the one-hop neighbor EN1 of M1, the opposite one-hop neighbor EN2 of M1, the access routers AR1 and AR2, the routers R1 and R2 and the correspondent node CN, respectively.

The signaling for the entire QoS-aware handover process according to the present invention is shown in FIG. 20. In this diagram the signaling of an "End-to-End QoS-Aware Handover" procedure and the interactions between the mobile node MN, the handover candidates M1 and M2, the one-hop neighbor EN1 of M1, the one-hop neighbor EN2 of M2, the access routers AR1 and AR2, the routers R1 and R2 and the correspondent node CN, respectively, can be seen.

The handover process is initiated within the mobile node MN by receiving a handover trigger.

MN sends the "Handover Initiation Message" to the correspondent node CN. CN is informed with the necessary QoS-aware handover control information.

CN performs a QoS metrics probing procedure along the potential path toward each candidate. (The whole probing procedure is done before the physical link layer handover process is processed.)

The probed QoS capability of each potential routing path is collected and analyzed within the mobile node MN.

Based on the probed QoS results, the potential handover candidate who offers the best QoS support is selected as the handover target node.

The real-time application running on the corresponding node CN is informed about the upcoming handover event and the expected throughput along the future new routing path.

MN releases the current connection and rebuilds a new wireless connection with this new access node. After the data link layer and network layer handover procedures are processed, the real-time traffic flow is transmitted along the new path.

Outstanding hard-reserved resources on the old path and soft-reserved resources on the other QoS probed paths are released actively or passively.

Figure 21:
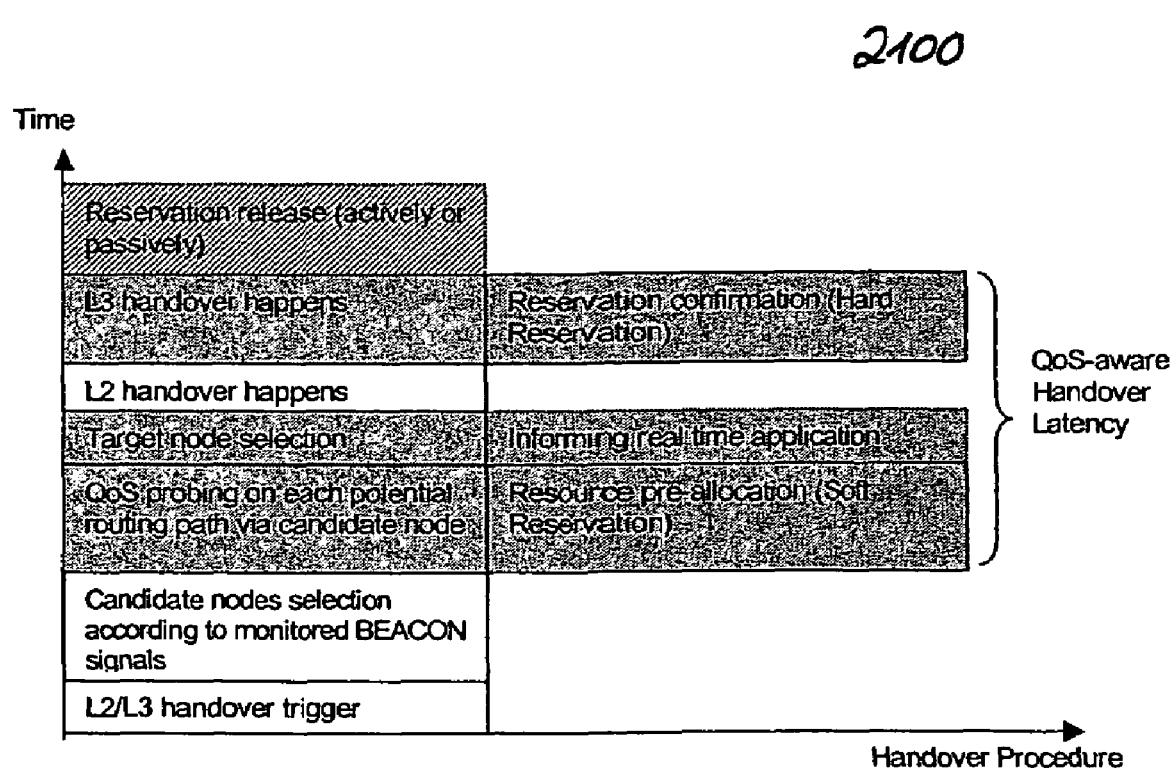
FIG. 21 shows a the timetable of a "End-to-End QoS-Aware Handover" cycle, wherein the interactions are shown in chronological order.

The cycle of the QoS-aware handover is shown in FIG. 21. State-of-the-art handover solutions without QoS consideration usually rely on basic parameters, such as the strength of a received signal, to determine the handover target node. The delay caused by such "basic" handover target node analysis process is relative short compared to the proposed mechanism. The handover latency caused by a QoS-aware handover is based on a QoS metrics probing procedure analyzing the potential handover target node that meets the requested QoS. During such a probing procedure no handover based on the data link layer is processed. The mobile node MN keeps the current connection alive to avoid any packet loss.

Once the mobile node MN has defined the potential handover target node, a network-layer based handover is initiated. The difference compared to prior-art solutions is that after the network layer handover has been processed, the granted QoS resources are immediately available for the reserved flows, whereas flows processed according to the state of the art have to re-establish the QoS resources. This could lead to reject QoS requests due to insufficient resource availability. In this case, real-time applications are affected by packet loss or an increased delay.

Figure 22:
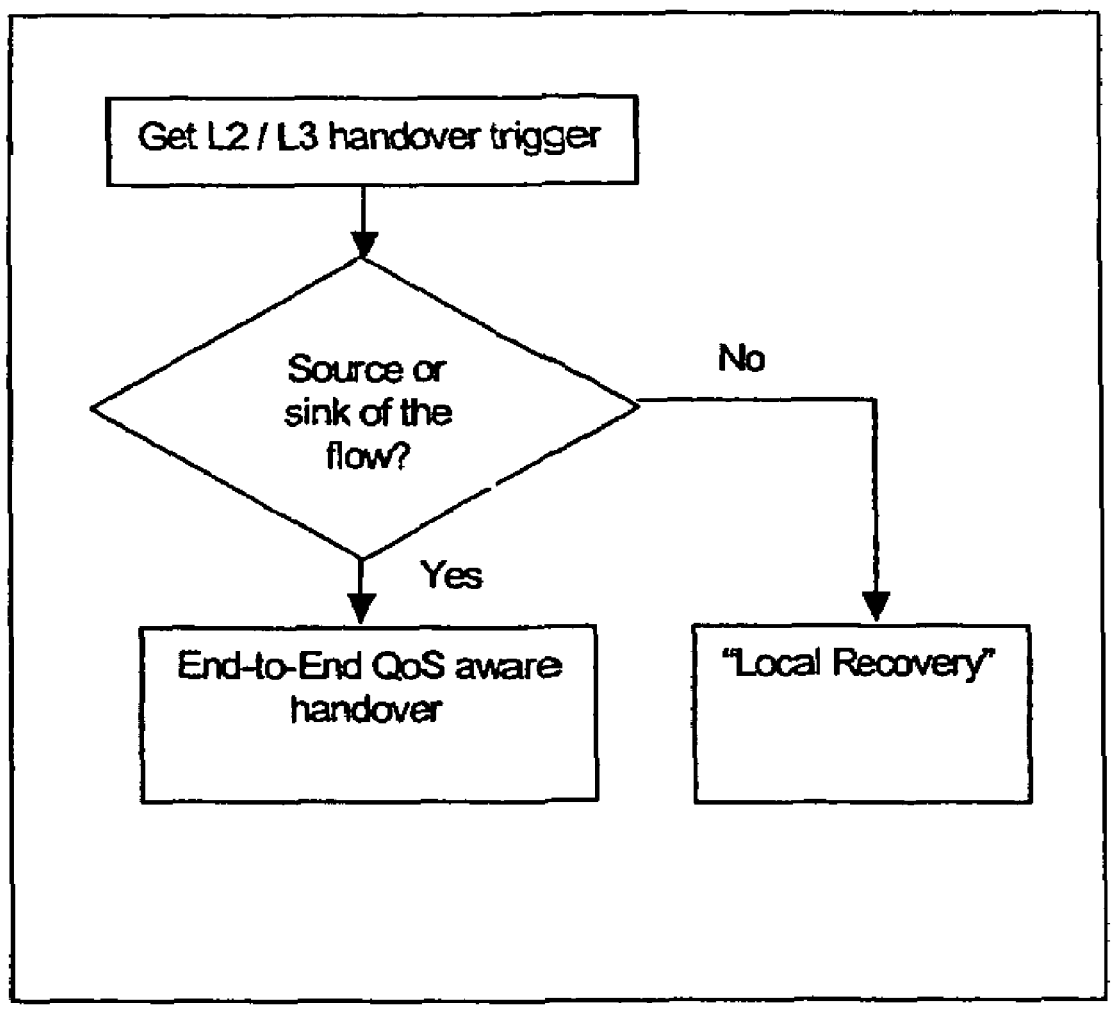
FIG. 22 is a flow chart of a node performing an "End-to-End QoS-Aware Handover" or "Local Recovery" after getting a handover trigger.

The foregoing sections are focused on a QoS-aware handover procedure where the mobile node MN is the source or the sink of a flow (see FIG. 22). Due to the fact that in a mobile ad-hoc network environment all nodes can be mobile, the case where the intermediate node of a flow (the forwarding node) is moving has to be studied.

Once an intermediate node is leaving its covering range, the established connection has to be redirected. This situation causes the flow path to be re-routed and leads to instabilities. To minimize the effect of flow redirections due to the mobility of the intermediate node, a so-called "Local Recovery" approach is proposed, which is based on the principles of the aforementioned "End-to-End QoS Aware Handover" method. In this approach, the handover negotiation is limited within a small range of the moving node that initiates the handover process. This results in minimized handover latency and reduced signaling along the end-to-end path.

In the example scenario shown in FIGS. 23 to 27, it is assumed that the current flow has been established between the mobile node MN and its correspondent node CN:

First, the intermediate node M1 is moving out of its coverage range.

Figure 23:
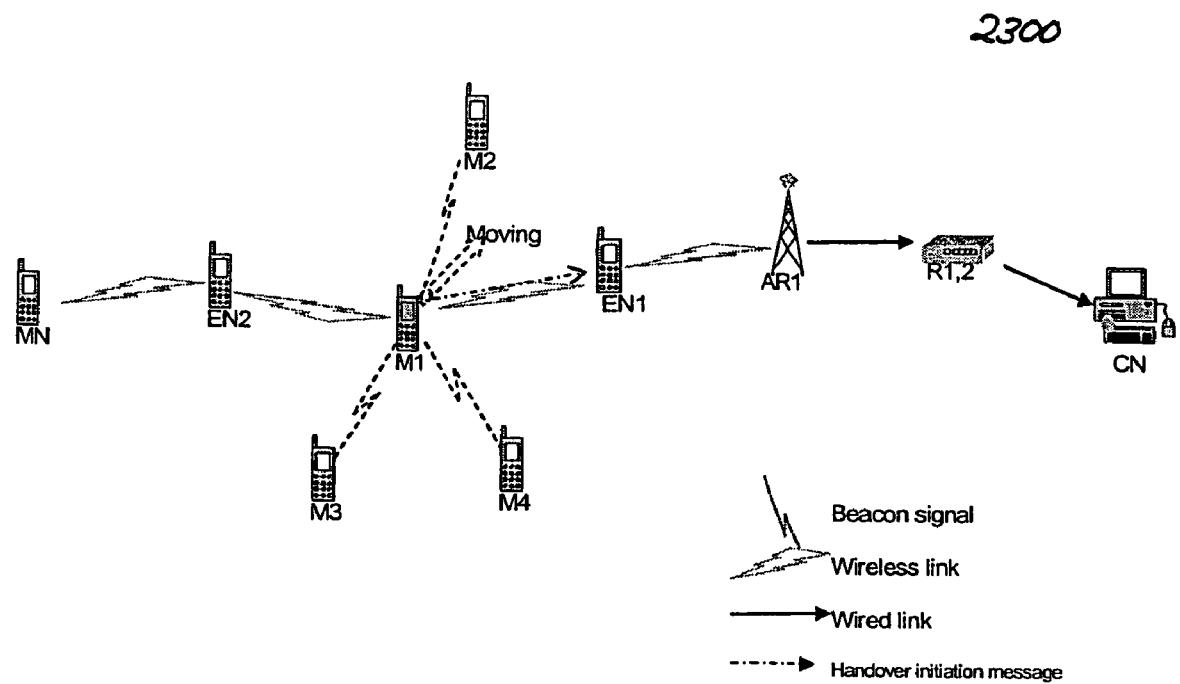
FIG. 23 shows a scenario where a "Handover Initiation Message" is sent by the node M1 to its one-hop neighbor EN1 within the "Local Recovery" approach.
Figure 24:
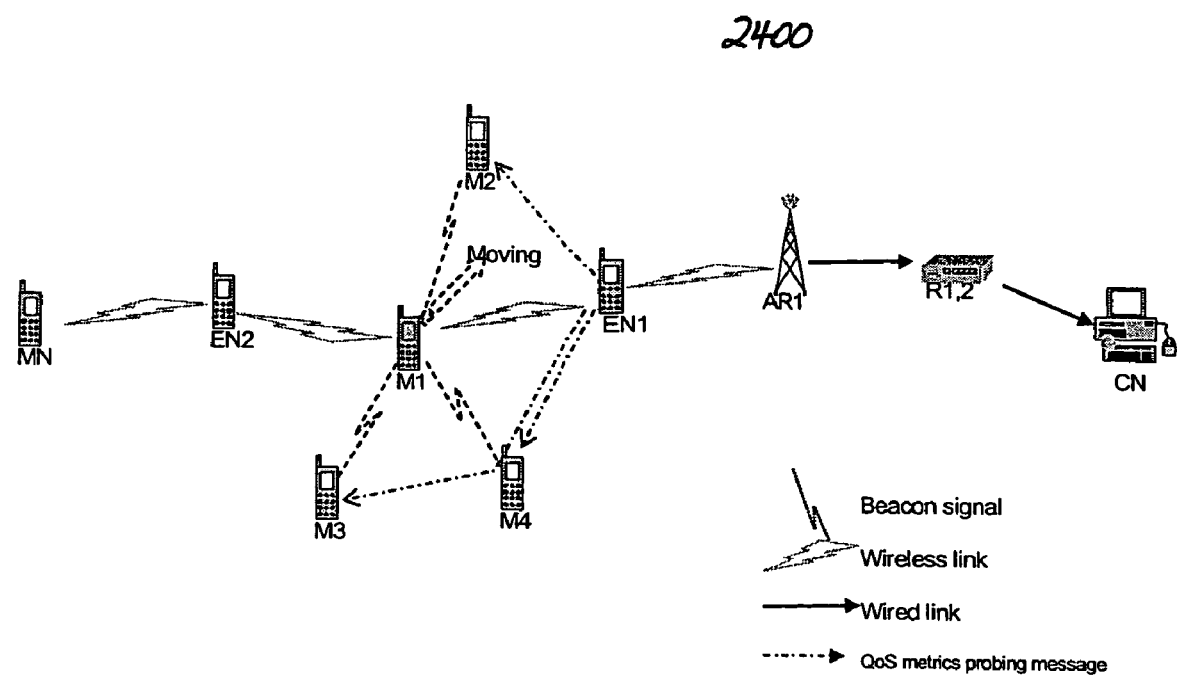
FIG. 24 shows a scenario within the "Local Recovery" approach where node EN1 is now in charge of QoS metrics probing by initiating a "Handover QoS Metrics Probing Message"

When a data link layer (layer 2) or network layer (layer 3) handover trigger interrupts the intermediate node M1, it generates a "Handover Initiation Message" (1600) and transmits it to its one-hop neighbor, e.g. EN1, on the flow path (not to the correspondent node CN as in the "End-to-End QoS Aware Handover" method), as depicted in FIG. 23.

The information stored in the "Flow ID" field, the required "QoS metrics", the addresses of potential handover candidate and the target node of the candidate are embedded within the "Handover Initiation Message". In the "Local Recovery" case, the target node addresses (taken as destination indication for the candidate node for the resource reservation evaluation) is not the moving node M1 itself, but the "opposite" one-hop neighbor EN2 on the flow path.

When receiving the "Handover Initiation Message", EN1 sends "Handover QoS Metrics Probing Messages" (1700) to probe the QoS metrics on the path towards each candidate node. In this example, this path is the path towards M2, M3, M4 (see FIG. 24).

According to the target address of the candidate (EN2) in the "Address Option" of the "Handover QoS Metrics Probing Messages", the candidate node reserves the resource towards EN2.

Figure 25:
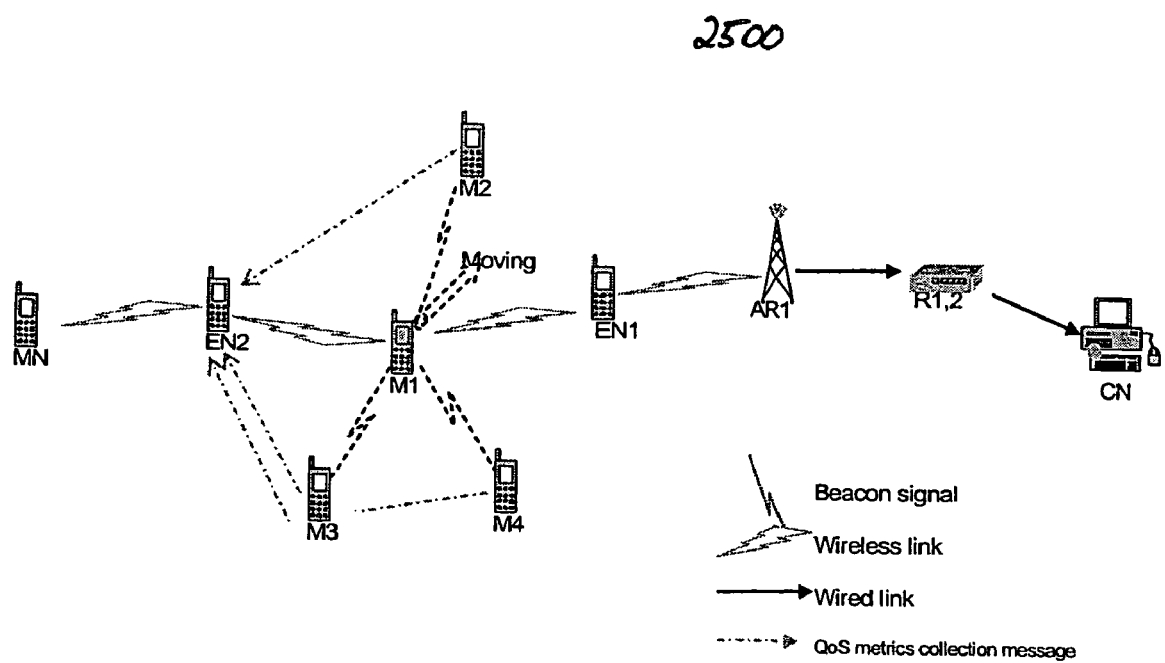
FIG. 25 shows a scenario within the "Local Recovery" approach where the "Handover QoS Metrics Collection Messages" are sent to the opposite one-hop neighbor EN2 of node M1 along the old traffic path.
Figure 26:
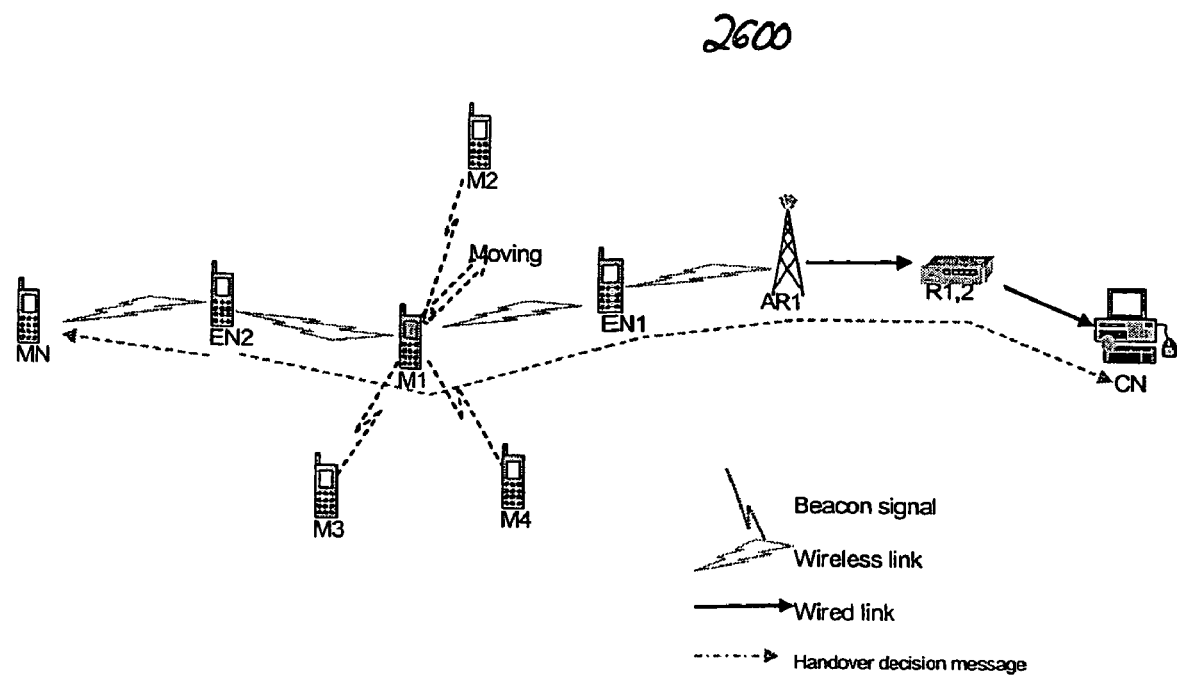
FIG. 26 shows a scenario within the "Local Recovery" approach where the node EN2 sends the "Handover Decision Messages" to the source MN and the sink node CN of the data to be transmitted.

After the reservation has been processed, each candidate (M2, M3, M4) transfer their probed results embedded in the "Handover QoS Metrics Collection Messages" (1800) towards EN2 (see FIG. 25).

Based on this information, the handover decision is taken on EN2.

EN2 selects (as an example) M3 as the handover target node.

The "Handover Decision Message" (1800) is sent to the terminating nodes of the flow to inform M1 that it can release its current connection. In addition with this message, the associated real-time application running on the mobile node MN and the correspondent node CN gets an indication to adapt to the upcoming QoS metrics (see FIG. 26).

EN2 releases the connection with M1 and executes a data link layer (layer 2) and network layer (layer 3) handover to the new handover target node M3.

Figure 27:
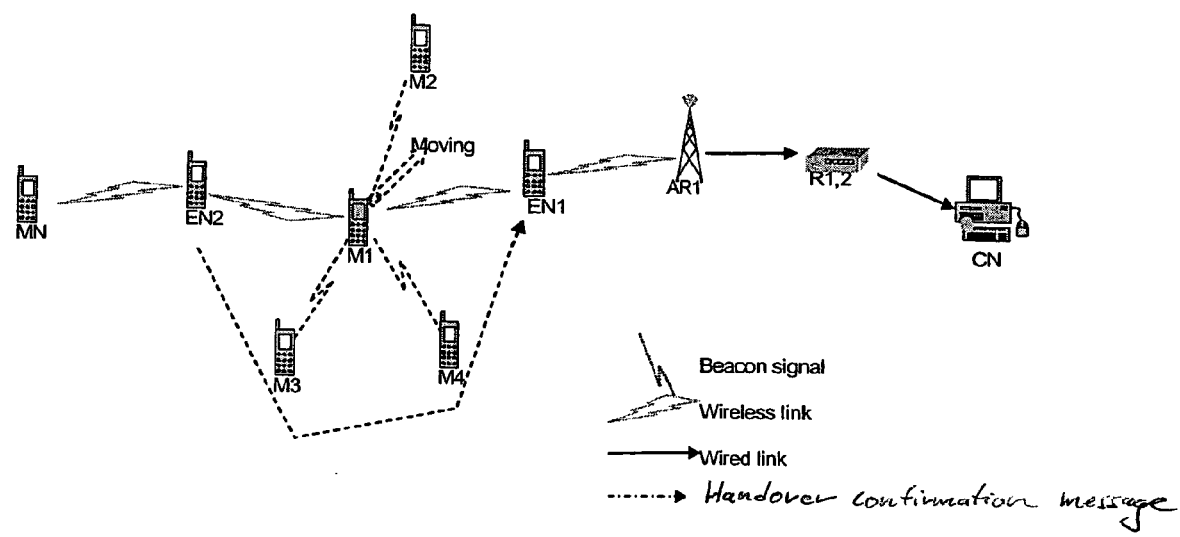
FIG. 27 shows the procedure of handover confirmation within the "Local Recovery" approach, wherein the node EN2 piggybacks the "Handover Confirmation Message" within the data packets sent to the correspondent node CN to change the state of the reserved resources from soft reservation (SR) to hard reservation (HR)

The "Handover Confirmation Message" (1900) is sent along the new path to change the "soft-reserved" state to a "hard-reserved" state (see FIG. 27).

Figure 28:
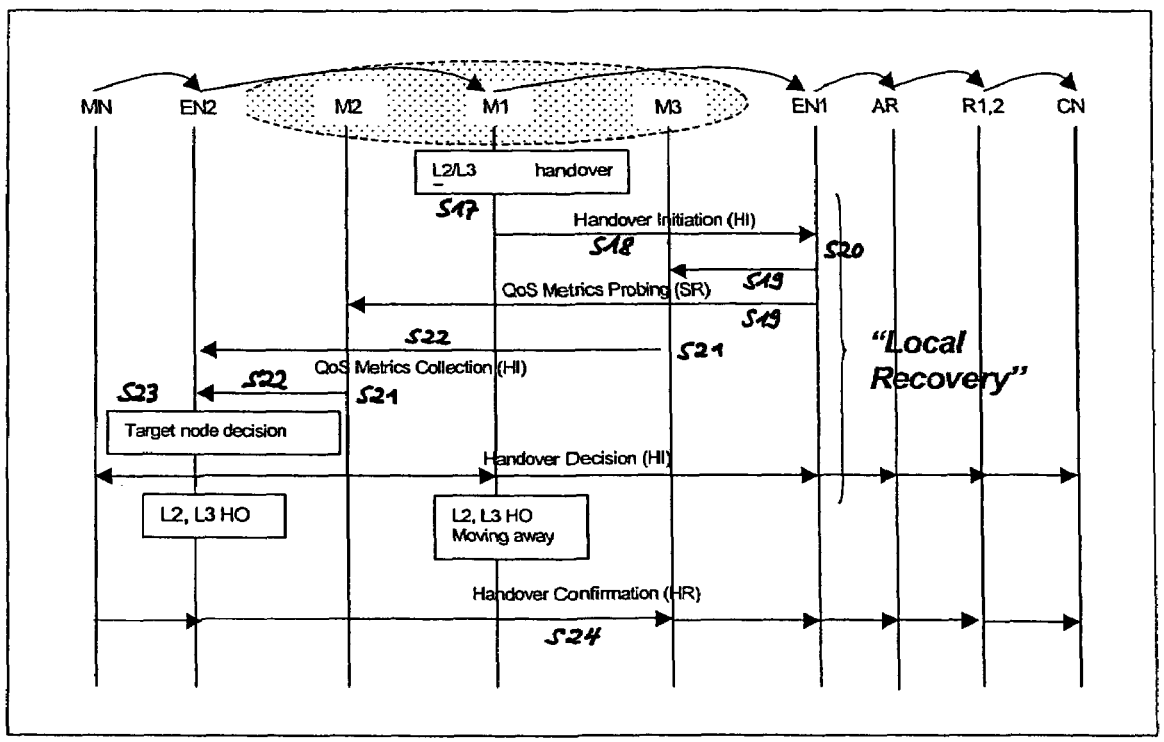
FIG. 28 is an interaction diagram showing the signaling procedure according to the "Local Recovery" approach.

Due to the frequent "Local Recovery", the routing path could become inefficient. To reduce this effect, the mobile node MN can process the "End-to-End QoS Aware Handover" solution to optimize the routing path. In this situation, it is beneficial to use the "End-to-End QoS Aware Handover" solution instead of the "Local Recovery" approach. An overview of the signaling of "Local Recovery" is illustrated in FIG. 28.

Due to the characteristics of mobile ad-hoc networks, address resolution protocols, such as IPv6 Neighbor Discovery (ND) and Inverse Neighbor Discovery (IND) protocols, do not provide optimal performance for the needs of a mobile node. Therefore, one embodiment of the present invention—the proposed "MIAMI" solution (MAC-IP Address Mapping Implementation)—is basically dedicated to disseminate the address mapping information within ad-hoc networks to increase the distributed availability of address information. The solution is used in a passive and smooth way to resolve non-immediate addresses and proactively keep such mapping information. In this concept, data is replicated within the networks reducing the delay for the address resolution.

Figure 29:
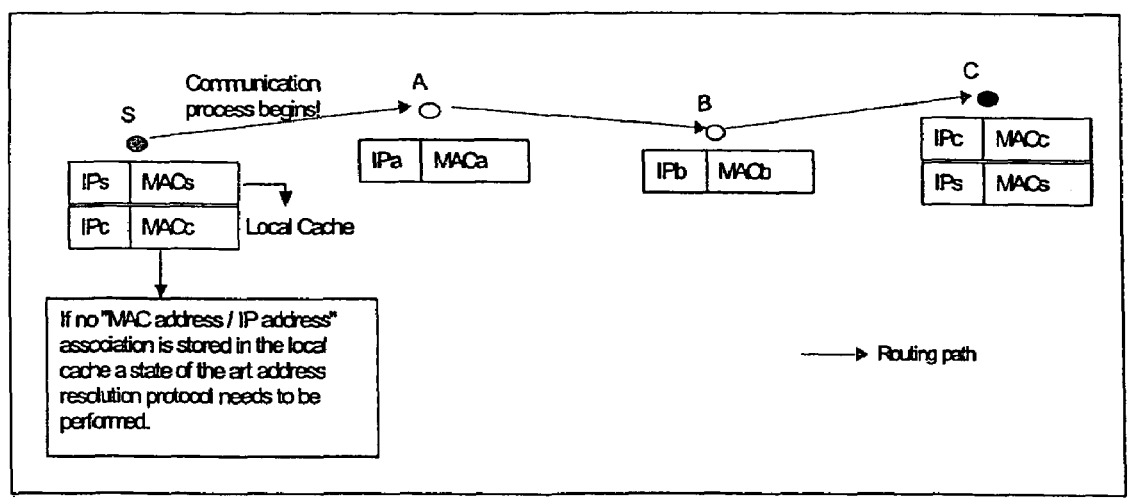
FIG. 29 shows the contents of each node's local address resolution cache before a MIAMI has been processed.

To illustrate the solution details, it shall be assumed that node S wants to establish a connection with node C:

FIG. 29 shows the initial address cache of node S and node C. Node S has cached the IPv6 address of node C without the associated MAC address information. In case this mapping information is available in the local cache of node S, the communication session could be initiated immediately. Otherwise, node S has to perform a state-of-the-art address resolution process, such as the IPv6 Neighbor Discovery (ND) protocol, to resolve the MAC address of node C. According to the IPv6 Neighbor Discovery protocol, nodes along the communication path, e.g. nodes A and B, are not directed to keep this mapping information.

Figure 30:
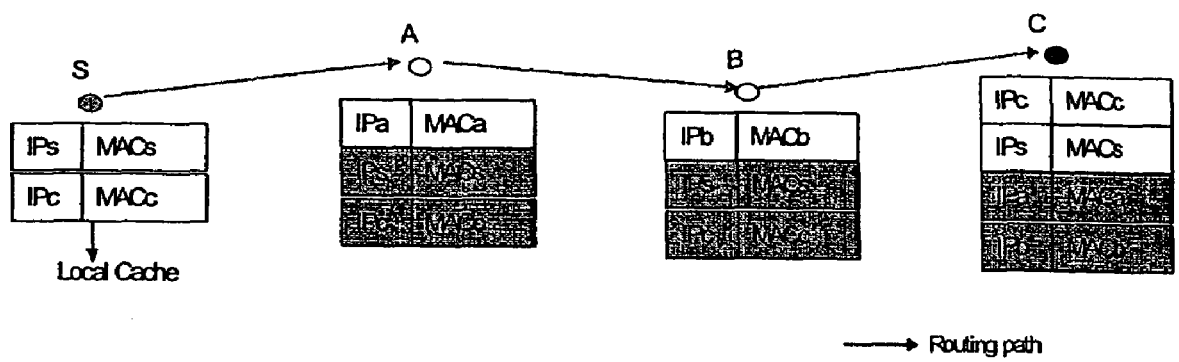
FIG. 30 shows the contents of each node's local address resolution cache after the MIAMI has been processed.

During the communication between node S and C, the intermediate nodes A and B are forwarding data packets. FIG. 30 shows node S adding its local mapping information (in this example the mapping information of node C and node S) into the "MIAMI Option" (see FIG. 37) and inserting this option into the IPv6 hop-by-hop options header of the data packets. The data packets are transferred along the path to node C.

Note that the MIAMI (MAC-IP Address Mapping Information) approach is an optional supplement to the QoS-aware handover procedure according to the present invention and can also be used in other contexts.

Whenever the intermediate node A receives packets carrying a "MIAMI Option", it can extract the mapping information and store it in the local routing cache. By forwarding the packets to the next hop, node A has the option to insert its own mapping information in the "MIAMI Option" of the hop-by-hop options header. This process is repeated along the communication path.

Finally, the packet arrives at node C. While analyzing the content of the respective "MIAMI Option", node C can cache the address mapping information of the intermediate nodes A and B.

Figure 31:
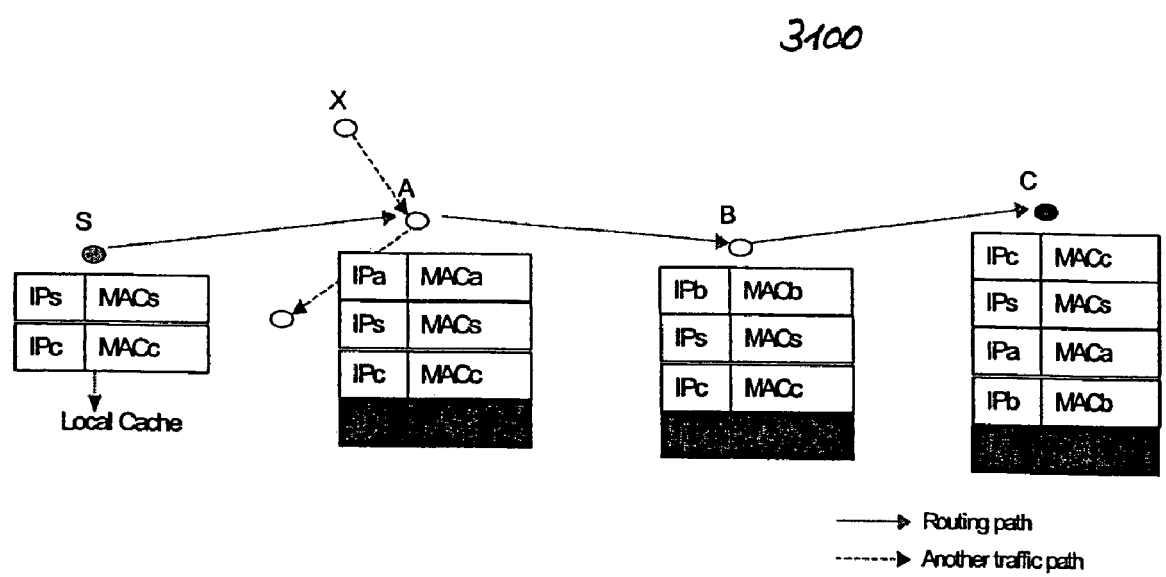
FIG. 31 shows the changes of local cache entries due to traffic generated from a node X, wherein it is assumed that node X uses the MIAMI approach to disseminate its address resolution information.
Figure 32:
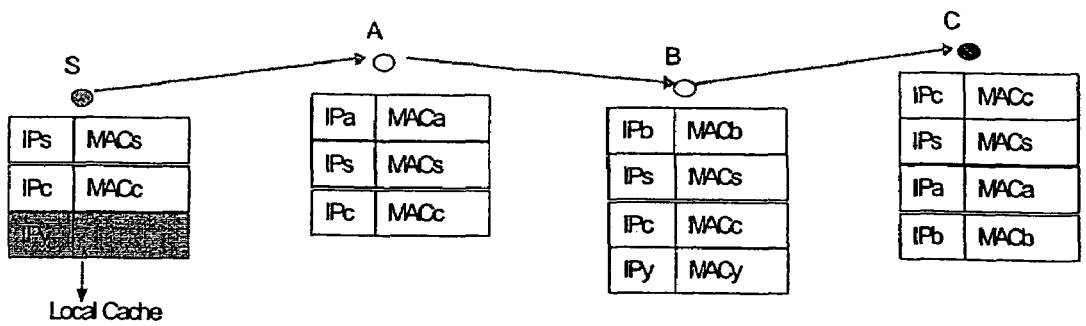
FIG. 32 shows a scenario where a node S initiates a "passive" address resolution based on MIAMI by requesting to resolve the address of a node Y and building a "MIAMI Option"
Figure 33:
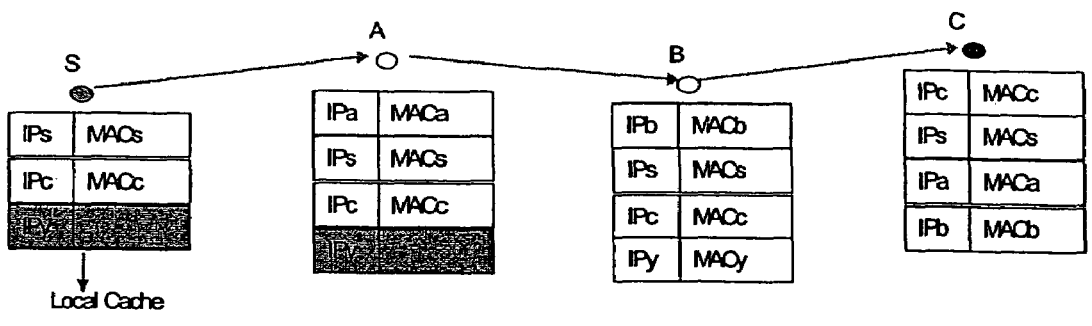
FIG. 33 shows a scenario where a node A holds no applicable data to response to the "passive" address resolution request of node S, which means that node A has no mapping information of node Y and when the data packets piggybacking a "MIAMI Option" arrive at node A, it holds no applicable data to response to the request and forwards the data packets to a node B.
Figure 34:
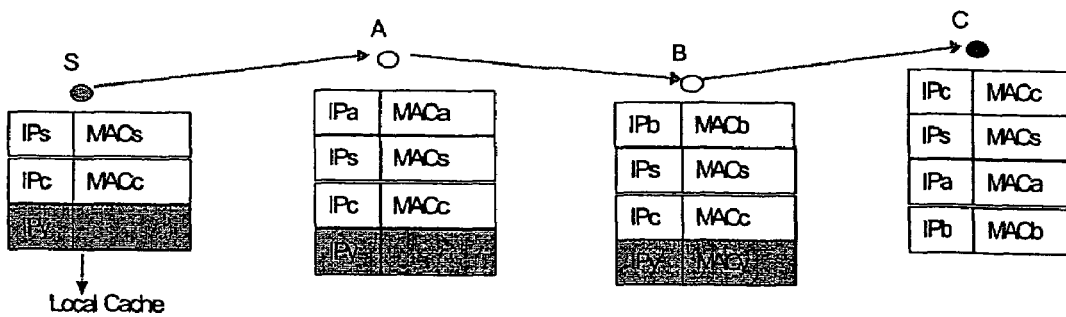
FIG. 34 shows a scenario where node B processes the "passive" address resolution request of node S, which means that node B holds the MAC address of node Y and therefore node B has the opportunity to add the MAC address of node Y in the "MIAMI Option"

In the following case, an additional flow passing the intermediate node A shall be considered:

FIG. 31 shows a second flow passing the intermediate node A. In this example it is assumed that the traffic generated by node X is forwarded by node A. A has the opportunity to extract the mapping information of node X embedded in the "MIAMI Option".

Node A can also add this own mapping information in the "MIAMI Option" of the IPv6 hop-by-hop options headers of data packets sent towards node C. With this concept, node B and C can retrieve the additional mapping information.

In case node S has a "potential" need for the mapping information of node Y and e.g. node S has the IPv6 address of node Y, but no MAC address of node Y, it can resolve the address of Y in a "passive" manner, instead of initiating the "active" "IPv6 Neighbor Discovery" operation. In this context, "active" operation means that the IPv6 Neighbor Discovery protocol immediately (actively) processes the address resolution request.

In the following, an example where node S has a "potential" requests for the address resolution of node Y is given. "Potential" in this case means that there is no need for an immediate feedback of the address resolution result. (The address resolution for a potential handover candidate should be evaluated.)

Node S builds a "MIAMI Option" (see FIG. 37). Thereby, node S fills in the IPv6 address of node Y in the IPv6 address field of the "MIAMI Option" and leaves the MAC address field empty (see FIG. 32).

It shall be assumed that node A has no mapping information of node Y. When the data packets arrive at node A, it holds no applicable data to response to the request and forwards the packets to node B (see FIG. 33).

In the next step, it shall be assumed that node B holds information on node Y. While receiving the "MIAMI Option", node B will be aware that someone in the network is requesting the address mapping information of node Y. For this reason, node B has the opportunity to add the MAC address of node Y in the "MIAMI Option". After the "MIAMI Option" update, node B forwards the data packet along the communication paths (see FIG. 34).

Figure 35:
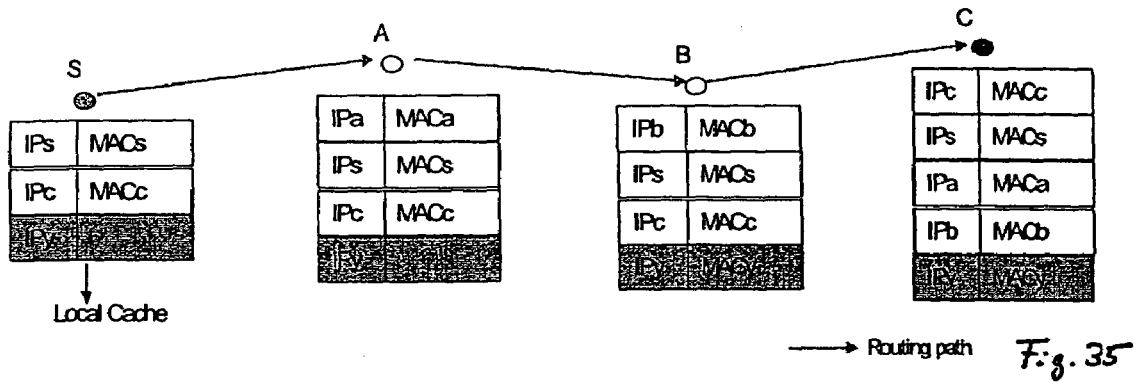
FIG. 35 shows a scenario where a node C receives the address information in the "passive" address resolution request of node S, which means that node C receives the "MIAMI Option" embedded within the data packets sent by node B and can then retrieve the address mapping information of node Y.
Figure 36:
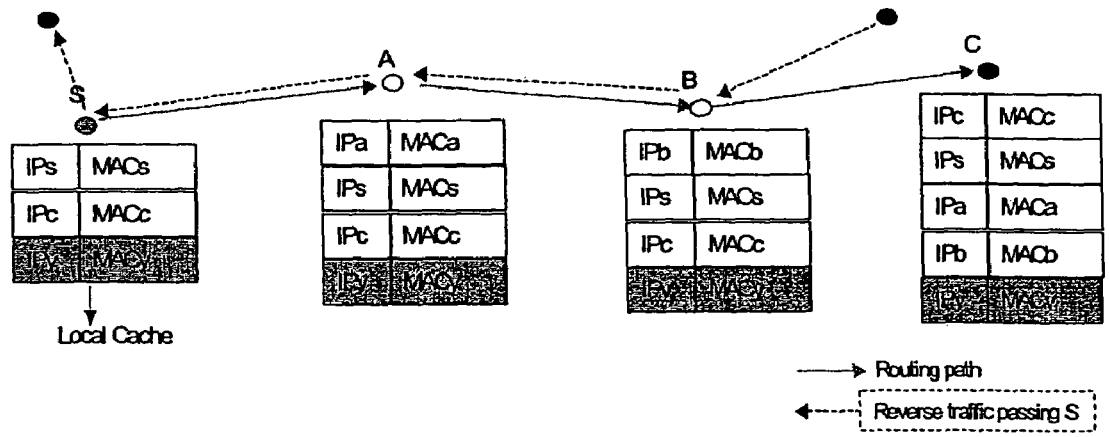
FIG. 36 shows a scenario where node S receives the requested address information via reverse traffic passing node B and A.

Node C is provided with the address mapping information on node Y whenever a "MIAMI Option" embedded in the data packets sent by node B is received (see FIG. 35).

Embedded within any "reverse" traffic passing node A, B, or C and node S, the requested information could finally be extracted out of the "MIAMI Option" by node S. This can be understood as a "passive and smooth" information dissemination process (see FIG. 36).

For the MIAMI solution a new IPv6 option is defined and piggybacked within the IPv6 hop-by-hop extension header for disseminating address mapping information as shown in FIG. 37. The MIAMI Option structure thereby comprises the following fields:

Option Type: an 8-bit identifier that specifies the type of the "MIAMI Option",

Option Length: an 8-bit unsigned integer field, which tells the length of the option in bytes, Flags: an 8-bit unsigned integer field, which indicates media type, network prefix information, or other information about the included MAC address (link layer address) and corresponding IPv6 address (network layer address), Lifetime: an 8-bit unsigned integer field (the maximum timeout value for the soft state timer), MAC address: a 48 bits MAC address, and IPv6 address: a 128 bits IPv6 address.

The proposed approach as disclosed in the above-specified embodiments of the invention provides the following advantages to the current state of the art:

The QoS-aware handover procedure is independent of any mobility management. It is neither a sender-oriented nor a receiver-oriented protocol. The mobile node performing a handover could be a terminating node of a specific flow or an intermediate node forwarding a specific flow.

The QoS-aware handover procedure applied to the source or sink node of the flow can use an end-to-end handover negotiation protocol. The resource is reserved on the routing path between the mobile node MN and the correspondent node CN.

"Local Recovery" is proposed to deal with the mobility of intermediate nodes, which localizes and limits the handover negotiation within a small range of the moving node. This concept provides fast adaptation to changing mobile ad-hoc network environments and minimizes round-trip resource reservation signaling delays.

The QoS-aware handover procedure according to the present invention is based on "soft state" for efficient resource reservation management. It combines "in-band" and "out-band" signaling approaches according to the role of the mobile node and the flow traffic direction. In-band and out-band signaling can be flexibly adopted for passing handover control information and resource reservation management information.

The QoS-aware handover procedure according to the present invention offers a "Make-Before-Break" handover model. The resource is pre-allocated along the potential path before the handover is processed. This approach thereby minimizes packet loss to reduce the negative effect for adaptive real-time applications.

The QoS-aware handover procedure according to the present invention is proposed as a network layer (layer 3) handover protocol, which is independent of any link layer wireless access technologies. It has also been designed to be independent of any particular mobility management solution.

The QoS-aware handover procedure according to the invention is a seamless handover model. The handover information is collected in advance of a data link layer (layer 2) and network layer (layer 3) handover. As an example, the handover candidate's IPv6 address along with its capabilities used for the handover target node selection process is provided to the handover decision node. During this probing mechanism the resources along each potential routing path are "soft-reserved".

In the following, the main differences between the proposed solution according to the present invention and already existing technologies according to the state of the art shall briefly be summarized.

In contrast to the INSIGNIA solution described in the article "INSIGNIA: An IP-based Quality-of-Service Framework for Mobile Ad-hoc Networks" (Journal of Parallel and Distributed Computing, Vol. 60 No. 4, pp. 374-406, April 2000) by Lee et al., the following features characterize the proposed solution: The proposed solution supports pre-allocation of resources during handover scenarios and offers a mechanism to inform running applications about an upcoming handover event. Besides, it provides a mechanism to announce QoS parameters that can be expected after the handover is finished. Finally, the proposed solution supports IPv6.

In contrast to the MRSVP solution, the proposed solution is able to dynamically establish selected reservations to well-defined locations. In comparison, in MRSVP a mobile host makes a passive reservation to all other locations it might visit. Moreover, the model has no restrictions with regard to mobility aspects. By contrast, MRSVP permits both the sender and/or the receiver of a QoS data flow to be mobile. Besides, the solution is able to change QoS-specifications in an adaptive and dynamic way, while MRSVP permits dynamic changes of said QoS specifications.

In contrast to the RSVP solution, the proposed solution supports pre-allocation of resources during handover scenarios. Besides, it offers a mechanism for a fast adaptation of routing changes, provides a mechanism to inform running applications about an upcoming handover event and offers a mechanism to announce QoS parameters that can be expected after the handover is finished.

In contrast to the MIPv6-enhanced solutions described above, the proposed solution is independent of any mobility management. Moreover, no additional logical network entities such as "Secondary Home Agent" are involved. All information is distributed. Finally, the invention provides a seamless handover protocol for mobile ad-hoc network environments and supports a pre-allocation of resources.

In contrast to the above scheme, the proposed solution offers a mechanism for a fast adaptation of routing changes. Moreover, it provides a mechanism to announce upcoming handover events and QoS parameters that can be expected after the handover procedure is finished. It should be noted that no new network entities are needed.

In contrast to the QoS routing solutions, the proposed solution according to the present invention is independent of any link layer (L2) wireless technologies and is based on an underlying routing protocol to setup a routing path for a flow. Moreover, the invention offers a mechanism for a fast adaptation of routing changes and provides a mechanism to announce upcoming handover event and QoS parameters that can be expected after the handover is finished. Finally, the proposed solution supports a pre-allocation of resources.

In contrast to the INORA solution, the proposed solution according to the present invention is independent of any routing protocols. Besides, it supports a pre-allocation of resources and provides a mechanism to announce upcoming handover events and QoS parameters that can be expected after the handover is finished.

The proposed MIAMI solution provides the following advantages to the current state of the art:

MIAMI is based on an in-band signaling approach and offers a "simple and lightweight" design. Only one new IPv6 option is necessary for the MIAMI design. When the concept of a standard IPv6 hop-by-hop options header is used, the address mapping information is propagated along with data packets.

MIAMI is an automatic, distributed and dynamic mechanism and works as a supplement to IPv6 ND/IND without much administrative intervention. For example, there is no central server or agent needed.

"MIAMI" is "proactive". The mobile node in the ad-hoc networks proactively adds its own address mapping information or other known mapping information in the IPv6 hop-by-hop options headers and distributes this information embedded within data packets. Other mobile nodes along the communicating path can evaluate the MIAMI option, save or update the information locally and then forward the packets to the next hop.

Mobile nodes can "passively" request the address mapping information. For example, a mobile node has the potential need to resolve a MAC address. If it is emergent, the node should perform the IPv6 ND protocol, otherwise the node can use MIAMI to execute a "soft" resolution process. In this case, the mobile node needs to build a "MIAMI Option", which leaves the MAC address field unfilled. While this MIAMI option is propagated within the ad-hoc network, other nodes have the opportunity to update the MAC address field and forward this mapping information to the next hop.

MIAMI offers the concept to disseminate MAC-IP mapping information. At the first stage, the mapping information could be located in several isolate "regions" among the mobile ad-hoc network. When more and more mobile nodes are involved within communication processes, said regions can be united, form larger regions, and finally build up a "distributed, dynamic" mapping information database.

In contrast to the IPv6 ND/IND solution, MIAMI is an "Information Dissemination" approach that replicates the address mapping information replication within the ad-hoc networks as described in the article "Information Dissemination in Partitionable Mobile Ad Hoc Networks" (IEEE, October 1999) by G. Karumanchi et al. MIAMI is not a "pure" stand-alone address resolution protocol. It has been designed to enhance state of the art address resolution protocols within the dynamic ad-hoc environment. To increase the availability of mapping information, enhanced local cached mapping information is used within the mobile nodes, which results in a reduced processing of prior-art address resolution protocols such as IPv6 ND/IND.

TABLE 1

Definition of Terms

| Term | Brief Explanation |
|---|---|
| Ad-hoc Computing | This term refers to an automatic discovery of general-purpose services advertised in a network. The discovery process can be based on predefined information about the respective service name and/or type. |

TABLE 1-continued

Definition of Terms

| Term | Brief Explanation |
| --- | --- |
| Ad-hoc Networking | By contrast, ad-hoc networking means the discovery of automatic devices and the establishment of connectivity among nearby devices in an unplanned, unmanaged fashion. Therefore, a routing of messages can be accomplished on the basis of a multi-hop technique, in which routing functionality is offered by most (if not even all) the nodes participating to the ad-hoc network. |
| Ad-hoc Networks | An ad-hoc network can be any network for mobile communication devices established by using the ad-hoc networking mechanism as described above. For example, it can be an unmanaged, unplanned network of fixed and/or moving intercommunicating computing devices. |
| Assisted Ad-hoc Networks | Likewise, an assisted ad-hoc network can be any network of communication devices established by using the ad-hoc networking mechanism as described above, but under the assistance and control of a so-called network operator providing AAA functionality and value added services. |
| Local Recovery | The "Local Recovery" mechanism is defined within the scope of the QoS-aware handover approach. The mechanism is proposed to localize the handover negotiation and minimize signaling delay and processing overhead. The "Local Recovery" mechanism has been designed to minimize QoS degradation of adaptive real-time services especially in dynamic mobile ad-hoc environments. |
| MIAMI | MIAMI is the abbreviation of "MAC-IP Address Mapping Implementation". MIAMI has been proposed to enhance address resolution approaches in an IP-based mobile ad-hoc environment. |
| Spontaneous Ad-hoc Networks | These are traditional ad-hoc networks, wherein no assistance from any network operator is provided whatever happens. Eventually, assisted ad-hoc networks can not keep up with spontaneous ad-hoc networks, whenever the involved peers get out of coverage of any access networks. |

TABLE 2

Depicted Features and their Corresponding Reference Signs

| No. | Technical Feature (System Component, Procedure Step) |
| --- | --- |
| 100 | diagram showing a situation where the wireless link between two wireless nodes $MN_1$ and $MN_2$ performing the IPv6 Neighbor Discovery (ND) or Inverse Neighbor Discovery (IND) protocol is possibly broken |
| 200 | diagram showing a handover candidate selection scenario in a wireless ad-hoc network environment, wherein a mobile node MN does not only keep the current connection, but also listens to BEACON signals transmitted by other mobile nodes M1 and M2 |
| 300 | diagram showing different parameters considered in a normal handover process (the strength of a received signal, RSS) and a QoS-aware handover process (the strength of the received signal and the QoS capabilities of the handover target node) |
| 400 | flow chart showing the operations on the mobile node MN activated by the handover initiation event after sending the "Handover Initiation Message" |
| 500 | diagram showing a mobile node MN sending a "Handover Initiation Message" to its correspondent node CN in order to activate a QoS capabilities probing procedure within the correspondent node CN |
| 600 | diagram showing a scenario where the mobile node MN is in charge of possessing a QoS probing by initiating a "Handover QoS Metrics Probing Message" |
| 700 | diagram showing a scenario where a one-hop neighbor EN1 of the mobile node MN is in charge of possessing the QoS probing by initiating the "Handover QoS Metrics Probing Message" |
| 800 | diagram showing a scenario where the correspondent node CN is in charge of possessing the QoS probing by initiating the "Handover QoS Metrics Probing Message" |
| 900 | structure of a QoS table stored in one node |
| 1000 | flow chart showing the QoS metrics probing message processing, which describes the operations of one node after receiving the "Handover QoS Metrics Probing Message" |
| 1100 | diagram showing a scenario of sending "Handover QoS Metrics Collection Messages" from candidates to the mobile node MN as a basis for handover decision |
| 1200 | diagram showing a handover decision procedure, wherein the mobile node MN decides for a handover target node according to the QoS probing results |
| 1300 | diagram showing a handover confirmation procedure, wherein a hard reservation message is sent from the mobile node MN to the correspondent node CN in order to change the state of the reserved resources from soft reservation (SR) to hard reservation (HR) |
| 1400 | diagram showing a scenario where a hard reservation (HR) message with a bandwidth request set to zero is sent along the old communication path and a non-selected |

TABLE 2-continued

Depicted Features and their Corresponding Reference Signs

| No. | Technical Feature (System Component, Procedure Step) |
|---|---|
| | potential routing path to release outstanding reservation (outstanding reservation release) |
| 1500 | diagram showing the structure of the newly defined IPv6 "Address Option" field for the QoS-aware handover |
| 1600 | diagram showing the format of the "Handover Initiation Message" which are embedded within an IPv6 destination options header |
| 1700 | diagram showing the format of the "Handover QoS Metrics Probing Message" embedded within an IPv6 hop-by-hop options header |
| 1800 | diagram showing the format of the "Handover QoS Metrics Collection Message" and the "Handover Decision Message" which are embedded within an IPv6 destination options header |
| 1900 | diagram showing the format of the "Handover Confirmation Message" embedded within an IPv6 hop-by-hop options header |
| 2000 | interaction diagram showing the signaling of an "End-to-End QoS-Aware Handover" procedure and the interactions between the mobile node MN, the handover candidates M1 and M2, the one-hop neighbor EN1 of M1, the one-hop neighbor EN2 of M2, the access routers AR1 and AR2, the routers R1 and R2 and the correspondent node CN, respectively |
| 2100 | diagram showing the timetable of a "End-to-End QoS-Aware Handover" cycle, wherein the interactions are shown in chronological order |
| 2200 | flow chart of a node performing an "End-to-End QoS-Aware Handover" or "Local Recovery" after getting a handover trigger |
| 2300 | diagram showing a scenario where a "Handover Initiation Message" is sent by the node M1 to its one-hop neighbor EN1 within the "Local Recovery" approach |
| 2400 | diagram showing a scenario within the "Local Recovery" approach where the node EN1 is now in charge of QoS metrics probing by initiating a "Handover QoS Metrics Probing Message" |
| 2500 | diagram showing a scenario within the "Local Recovery" approach where the "Handover QoS Metrics Collection Messages" are sent to the opposite one-hop neighbor EN2 of node M1 along the old traffic path |
| 2600 | diagram showing a scenario within the "Local Recovery" approach where the node EN2 sends the "Handover Decision Messages" to the source node MN and the sink node CN of the data to be transmitted |
| 2700 | diagram showing the procedure of handover confirmation within the "Local Recovery" approach, wherein the node EN2 piggybacks the "Handover Confirmation Message" within the data packets sent to the correspondent node CN to change the state of the reserved resources from soft reservation (SR) to hard reservation (HR) |
| 2800 | interaction diagram showing the signaling procedure according to the "Local Recovery" approach |
| 2900 | diagram showing the contents of each node's local address resolution cache before a MIAMI has been processed |
| 3000 | diagram showing the contents of each node's local address resolution cache after the MIAMI has been processed |
| 3100 | diagram showing the changes of local cache entries due to traffic generated from a node X, wherein it is assumed that node X uses the MIAMI approach to disseminate its address resolution information |
| 3200 | diagram showing a scenario where a node S initiates a "Passive" address resolution based on MIAMI by requesting to resolve the address of a node Y and building a "MIAMI Option" |
| 3300 | diagram showing a scenario where a node A holds no applicable data to response to the "Passive" address resolution request of node S, which means that node A has no mapping information of node Y and when the data packets piggybacking a "MIAMI Option" arrive at node A, it holds no applicable data to response to the request and forwards the data packets to a node B |
| 3400 | diagram showing a scenario where node B processes the "Passive" address resolution request of node S, which means that node B holds the MAC address of node Y and therefore node B has the opportunity to add the MAC address of node Y in the "MIAMI Option" |
| 3500 | diagram showing a scenario where a node C receives the address information in the "Passive" address resolution request of node S, which means that node C receives the "MIAMI Option" embedded within the data packets sent by node B and can then retrieve the address mapping information of node Y |
| 3600 | diagram showing a scenario where node S receives the requested address information via reverse traffic passing node B and A |
| 3700 | diagram showing the structure of the IPv6 option for the MIAMI solution (the so-called "MIAMI Option Structure") |
| S1 | step #1: proactively probing QoS resources of each potential routing path between a mobile node MN and its correspondent node CN |
| S2 | step #2: pre-allocating QoS resources along potential routing paths in advance before the handover of a data flow to be transmitted from the mobile node MN to its correspondent node CN via a selected routing path is initiated |
| S3a | step #3a: redirecting the data flow to the routing path with the best available QoS capabilities and, in case of sufficient QoS capabilities |
| S3b | step #3b: reserving QoS resources for the handled data flow to be transmitted |
| S4 | step #4: offering a mechanism for a fast adaptation of routing changes |

TABLE 2-continued

Depicted Features and their Corresponding Reference Signs

| No. | Technical Feature (System Component, Procedure Step) |
|---|---|
| S5 | step #5: providing a mechanism to inform running applications about an upcoming handover event |
| S6 | step #6: offering a mechanism to announce QoS parameters that can be expected after a handover procedure is finished |
| S7 | step #7 (optional supplement): pro-actively propagating address-mapping information in the dynamic mobile ad-hoc network environment to increase the availability of address resolution data, shorten the delay in session setup and minimize the signaling overhead within the network |
| S8 | step #8: releasing reserved resources on other probed routing paths than the respectively selected routing path |
| S9 | step #9: pre-selecting nodes from a number of potential handover candidate nodes M1, M2, M3, and M4 indicating a stable signal strength in the environment of the mobile node MN dependent on the received signal power of RF signals received via these handover candidate nodes M1, M2, M3, and M4 |
| S10 | step #10: sending a "Handover Initiation Message" to the correspondent node CN to initiate a handover from the mobile node MN to one of said handover candidate nodes M1, M2, M3, and M4 |
| S11 | step #11: selecting the handover candidate node M2 which offers the best available QoS metrics on the routing path from the mobile node MN to the correspondent node CN based on the information contained in a "Handover QoS Metrics Collection Message" received from the respective handover candidate nodes M1, M2, M3, and M4 |
| S12 | step #12: hop-by-hop sending a "Handover Confirmation Message" with an embedded bandwidth reservation request piggybacked within the traffic from the mobile node MN via the respectively selected handover candidate node M2 to the correspondent node CN |
| S13 | step #13: sending a "Handover QoS Metrics Probing Message" hop-by-hop to each handover candidate node M1, M2, M3, and M4 |
| S14 | step #14: performing a QoS probing procedure for analyzing the QoS metrics of each potential handover candidate node M1, M2, M3, and M4 as well as a resource pre-allocation along potential routing paths between the mobile node MN and its correspondent node CN |
| S15 | step #15: executing a QoS metrics collection procedure |
| S16 | step #16: sending a "Handover QoS Metrics Collection Message" as a reply message to the "Handover QoS Metrics Probing Message" received from the correspondent node CN to the mobile node MN to inform the mobile node MN of the QoS capability of each candidate node M1, M2, M3, and M4 |
| S17 | step #17: pre-selecting nodes from a number of potential handover candidate nodes M2, M3, and M4 indicating a stable signal strength in the environment of the moving intermediate node M1 dependent on the received signal power of RF signals received via these handover candidate nodes M2, M3, and M4 |
| S18 | step #18: sending a "Handover Initiation Message" to its one-hop neighbor node EN1 on the routing path towards the correspondent node CN to initiate a handover from the intermediate node M1 to one of said handover candidate nodes M2, M3, or M4 |
| S19 | step #19: sending a "Handover QoS Metrics Probing Message" hop-by-hop to each handover candidate node M2, M3, and M4 to probe the QoS metrics on the routing path towards these nodes M2, M3, and M4 |
| S20 | step #20: performing a QoS probing procedure for analyzing the QoS metrics of each potential handover candidate node M2, M3, and M4 as well as a resource pre-allocation along potential routing paths between the mobile node MN and its correspondent node CN via said one-hop neighbor node EN1 |
| S21 | step #21: executing a QoS metrics collection procedure |
| S22 | step #22: sending a "Handover QoS Metrics Collection Message" as a reply message to the "Handover QoS Metrics Probing Message" received from the one-hop neighbor node EN1 of the moving intermediate network node M1 on the routing path from the mobile node MN towards its correspondent node CN to the opposite one-hop neighbor node EN2 of the moving intermediate network node M1 on the routing path from the mobile node MN towards its correspondent node CN to inform this node EN2 of the QoS capability of each candidate node M2, M3, and M4 |
| S23 | step #23: selecting the handover candidate node M3 which offers the best available QoS metrics on the routing path from the mobile node MN to the correspondent node CN based on the information contained in a "Handover QoS Metrics Collection Message" received from the respective handover candidate nodes M2, M3, and M4 |
| S24 | step #24: hop-by-hop sending a "Handover Confirmation Message" with an embedded bandwidth reservation request piggybacked within the traffic from the mobile node MN to the correspondent node CN via the respectively selected handover candidate node M3 |

The invention claimed is:

1. A handover method for a wireless mobile ad-hoc network including interconnected mobile nodes, wherein a connectivity of the nodes is time-varying, the method comprising:

determining Quality of Service (QoS) resources of each potential routing path between a mobile node and a correspondent node;

pre-allocating the QoS resources along at least one potential routing path in advance before initiating a handover of a data flow to be transmitted from the mobile node to the correspondent node via a selected routing path; and redirecting the data flow to a routing path with best available QoS capabilities as the selected routing path and, in case of sufficient QoS capabilities, reserving the determined QoS resources for the data flow to be transmitted via the selected routing path.

2. The handover method according to claim 1, further comprising:

informing running applications about an upcoming handover event.

3. The handover method according to claim 1, further comprising:

announcing QoS parameters that can be expected after completing the handover.

4. The handover method according to claim 1, further comprising:

propagating address-mapping information in the mobile ad-hoc network.

5. The handover method according to claim 1, further comprising:

applying soft reservation requests to reserve, update and monitor QoS parameters along a routing path between the mobile node and the correspondent node.

6. The handover method according to claim 1, further comprising:

applying hard reservation requests to reserve, change or remove predefined QoS parameters on a routing path between the mobile node and the correspondent node.

7. The handover method according to claim 1, further comprising:

releasing pre-allocated resources on the at least one potential routing path other than the selected routing path.

8. The handover method according to claim 1, further comprising:

moving a mobile node out of a covering range of the mobile node;

pre-selecting handover candidate nodes from nodes in the interconnected mobile nodes dependent on a received signal power of RF signals received via said handover candidate nodes;

sending a handover initiation message to the correspondent node to initiate a handover from the mobile node to one of said handover candidate nodes;

selecting the handover candidate node including best available QoS capabilities on a routing path from the mobile node to the correspondent node based on information contained in a handover QoS metrics collection message received from the handover candidate nodes; and performing hop-by-hop sending of a handover confirmation message with an embedded bandwidth reservation request piggybacked within traffic from the mobile node via the selected handover candidate node to the correspondent node.

9. The handover method according to claim 8, wherein the correspondent node performs the following:

sending a handover QoS metrics probing message hop-by-hop to each handover candidate node;

performing a QoS probing procedure for analyzing QoS capabilities of each handover candidate node; and performing a resource pre-allocation along the at least one potential routing path between the mobile node and the correspondent node.

10. The handover method according to claim 9, wherein each handover candidate node performs the following:

executing a QoS metrics collection procedure; and sending a handover QoS metrics collection message as a reply message to a handover QoS metrics probing message received from the correspondent node to inform the mobile node of QoS capabilities of each handover candidate node.

11. The handover method according to claim 1, wherein the mobile node communicates with the correspondent node via plural intermediate network nodes in the interconnected mobile nodes, at least one moved intermediate network node moves out of a covering range of the at least one moved intermediate network node, and the at least one intermediate node performs the following:

pre-selecting nodes from handover candidate nodes dependent on the received signal power of RF signals received via the handover candidate nodes; and sending a handover initiation message to a one-hop neighbor node on the routing path towards the correspondent node to initiate a handover from the at least one moved intermediate network node to one of said handover candidate nodes.

12. The handover method according to claim 11, wherein the one-hop neighbor node of the at least one moved intermediate network node on the routing path from the mobile node towards the correspondent node performs the following:

sending a handover QoS metrics probing message hop-by-hop to each handover candidate node to probe QoS capabilities on each routing path towards the handover candidate nodes;

performing a QoS probing procedure for analyzing QoS capabilities of each handover candidate node; and performing a resource pre-allocation along potential routing paths between the mobile node and the correspondent node via said one-hop neighbor node.

13. The handover method according to claim 12, wherein each handover candidate node performs the following:

executing a QoS metrics collection procedure; and sending a handover QoS metrics collection message as a reply message to the handover QoS metrics probing message received from the one-hop neighbor node of the moved intermediate network node on the routing path from the mobile node towards the correspondent node to an opposite one-hop neighbor node of the moved intermediate network node on the routing path from the mobile node towards the correspondent node to inform the opposite one-hop neighbor node of QoS capabilities of each handover candidate node.

14. The handover method according to claim 13, further comprising:

selecting, by the opposite one-hop neighbor node, a handover candidate node which offers best available QoS capabilities on the routing path from the mobile node to the correspondent node based on information contained in the handover QoS metrics collection messages received from the handover candidate nodes.

15. The handover method according to claim 14, further comprising:

performing, by the mobile node, hop-by-hop sending of a handover confirmation message with an embedded bandwidth reservation request piggybacked within traffic from the mobile node to the correspondent node via the selected handover candidate node.

16. A cellular telecommunication network with QoS-aware handover management functionality providing a handover method according to claim 1.

17. A mobile base station, comprising:
- a determining unit configured to determine Quality of Service (QoS) resources of each potential routing path to a correspondent node;
- a pre-allocating unit configured to pre-allocate the QoS resources along at least one potential routing path in advance before initiating a handover of a data flow to be transmitted to the correspondent node via a selected routing path;
- a redirecting unit configured to redirect the data flow to a routing path with best available QoS capabilities as the selected routing path and, in case of sufficient QoS capabilities, reserve QoS resources for the data flow to be transmitted via the selected routing path.

18. A computer program product that stores computer executable instructions, wherein the instructions, when executed by a processor, cause the processor to perform a method comprising:
- determining Quality of Service (QoS) resources of each potential routing path between a mobile node and a correspondent node;
- pre-allocating the QoS resources along at least one potential routing path in advance before initiating a handover of a data flow to be transmitted from the mobile node to the correspondent node via a selected routing path; and
- redirecting the data flow to a routing path with best available QoS capabilities as the selected routing path and, in case of sufficient QoS capabilities, reserving the determined QoS resources for the data flow to be transmitted via the selected routing path.

* * * * *